United States Patent
Noh et al.

(10) Patent No.: US 11,770,043 B2
(45) Date of Patent: Sep. 26, 2023

(54) ELECTRIC MOTOR ASSEMBLY FOR REDUCING AIR FLOW LOSS

(71) Applicant: LG Electronics Inc., Seoul (KR)

(72) Inventors: Jaegeun Noh, Seoul (KR); Jinsub Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 17/337,034

(22) Filed: Jun. 2, 2021

(65) Prior Publication Data
US 2022/0069665 A1 Mar. 3, 2022

(30) Foreign Application Priority Data
Aug. 31, 2020 (KR) .................. 10-2020-0110326

(51) Int. Cl.
*H02K 5/20* (2006.01)
*H02K 5/24* (2006.01)
*H02K 7/08* (2006.01)
*H02K 9/06* (2006.01)
*H02K 21/16* (2006.01)

(52) U.S. Cl.
CPC .............. *H02K 5/207* (2021.01); *H02K 5/24* (2013.01); *H02K 7/083* (2013.01); *H02K 9/06* (2013.01); *H02K 21/16* (2013.01)

(58) Field of Classification Search
CPC ............ H02K 5/15; H02K 5/16; H02K 5/161; H02K 5/1173; H02K 5/1732; H02K 5/20; H02K 5/207; H02K 7/08; H02K 7/083; H02K 9/06; H02K 5/24; H02K 21/16
USPC ................................................ 310/406–409
See application file for complete search history.

(56) References Cited

U.S. PATENT DOCUMENTS

| | | | |
|---|---|---|---|
| 2016/0037984 A1* | 2/2016 | Park | F04D 29/626 |
| | | | 15/326 |
| 2018/0266426 A1* | 9/2018 | Lee | A47L 9/22 |
| 2019/0191949 A1 | 6/2019 | Hayamitsu | |
| 2019/0305620 A1* | 10/2019 | Sawada | H02K 1/28 |

(Continued)

FOREIGN PATENT DOCUMENTS

| | | |
|---|---|---|
| CN | 108350900 | 7/2018 |
| EP | 3376043 | 9/2018 |

(Continued)

OTHER PUBLICATIONS

Extended European Search Report in European Appln No. 21172398.6, dated Oct. 20, 2021, 7 pages.

(Continued)

*Primary Examiner* — Eric Johnson
(74) *Attorney, Agent, or Firm* — Fish & Richardson P.C.

(57) ABSTRACT

An electric motor assembly includes an impeller, a guide vane disposed at a one side of the impeller along an axial direction, a stator disposed at one side of the guide vane along the axial direction, a rotor configured to rotate relative to the stator to thereby rotate the impeller, and a frame disposed at an outside of the stator in a radial direction and coupled to the stator. The frame includes a body that has a cylindrical shape, that is disposed at the outside of the stator, and that defines an air flow path, and a plurality of stator fixing parts that protrude from an inner surface of the body and are coupled to the stator. The plurality of stator fixing parts are inclined with respect to the axial direction.

20 Claims, 25 Drawing Sheets

(56) References Cited

U.S. PATENT DOCUMENTS

2020/0036262 A1    1/2020  Kopper et al.
2020/0217330 A1*   7/2020  Fujiwara .............. F04D 29/4226
2021/0235951 A1*   8/2021  Hwang .................... A47L 9/22

FOREIGN PATENT DOCUMENTS

| | | |
|---|---|---|
| JP | 2016153636 | 8/2016 |
| JP | 2016154426 | 8/2016 |
| JP | 2018074858 | 5/2018 |
| KR | 100176836 | 11/1998 |
| KR | 101397810 | 5/2014 |
| KR | 20150140200 | 12/2015 |
| WO | WO2016194256 | 12/2016 |
| WO | WO 2019212294 | 11/2019 |
| WO | WO-2019212294 A1 * | 11/2019 ............... A47L 5/24 |

OTHER PUBLICATIONS

Office Action in Korean Appln. No. 10-2020-0110326, dated Jul. 8, 2022, 15 pages (with English translation).
Office Action in Chinese Appln. No. 202110430227.X, dated Apr. 8, 2023, 21 pages (with English translation).

* cited by examiner

ELECTRIC MOTOR ASSEMBLY FOR REDUCING AIR FLOW LOSS

CROSS-REFERENCE TO RELATED APPLICATION

Pursuant to 35 U.S.C. § 119(a), this application claims the benefit of the earlier filing date and the right of priority to Korean Patent Application No. 10-2020-0110326, filed on Aug. 31, 2020, the contents of which are incorporated by reference herein in their entirety.

TECHNICAL FIELD

The present disclosure relates to an electric motor assembly.

BACKGROUND

An electric motor or motor is an apparatus that can convert electric energy into mechanical energy. For example, motors can include a stator and a rotor configured to rotate with respect to the stator. In some cases, the motor can be a part of a motor assembly that includes an impeller and a frame to generate pressure or to facilitate a flow of air during rotation.

For instance, the motor assembly includes an impeller, a stator provided at one side of the impeller, a rotor that is rotatably installed with respect to the stator and is configured to rotate the impeller, and a frame coupled to an outer surface of the stator. An impeller housing can be coupled to the frame and accommodate the impeller. In some cases, bearings may be provided at both sides of a rotating shaft of the rotor, respectively. For example, one of the bearings may be provided at the frame, and the other one may be supported by a bracket that is coupled to the frame.

In some cases, the frame may include a stator fixing part (or portion) that is coupled to the outer surface of the stator, and the bracket may be coupled to the stator fixing part. The stator can include a stator core, a stator coil wound around the stator core, and an insulator for insulating the stator core and the stator coil. In some cases, the motor assembly can include a printed circuit board (PCB) that supplies driving power to the stator and is coupled to the insulator of the stator.

In some cases, a performance of the motor assembly can be decreased with an increase in air flow loss due to parts (or components) disposed in a flow path of air moved by the impeller. For example, where the stator fixing part extends along an axial direction, an air flow stagnant zone can be generated in a periphery of the stator fixing part, causing an increase in flow path loss.

In some cases, a decrease in width of the stator fixing part, which is implemented to reduce the flow path loss, can cause a reduction in a coupling force (bearing force) between the bearings, the impeller, and the PCB. As a result, a clearance of parts coupled to the frame can be increased, and unnecessary vibration and noise can occur.

In some cases, where the stator fixing part axially protrudes from a body of the frame having a ring shape, some of air that has passed through the body may be spread or diffused in a radial direction, and air flow in the axial direction can be reduced, which can result in performance degradation.

SUMMARY

The present disclosure describes an electric motor assembly that can reduce an air flow loss.

The present disclosure also describes an electric motor assembly that can suppress formation of a flow stagnant zone of air moved by an impeller.

The present disclosure also describes an electric motor assembly that can secure coupling between parts (components) and suppress generation of vibration and noise.

The present disclosure also describes an electric motor assembly that can suppress radial diffusion of air and formation of an air flow stagnant zone.

Implementations disclosed herein provide an electric motor assembly that can include a stator fixing part. The stator fixing part can be coupled to an outer surface of a stator and inclined with respect to an axial direction.

For example, the electric motor assembly can include a stator provided at one side of an impeller and a rotor configured to rotate the impeller and disposed at an inside of the stator. The stator fixing part can be coupled to an outside of the stator and inclined in the axial direction so as to correspond to a rotational component of air moved by the impeller, and thus, formation of an air flow stagnant zone where air moved by the impeller remains over an extended period can be suppressed.

In some implementations, the stator fixing part can be one of a plurality of stator fixing parts that are spaced apart from one another along a circumferential direction. For example, the plurality of stator fixing parts can be three in number to securely support the stator.

According to one aspect of the subject matter described in this application, an electric motor assembly includes an impeller, a guide vane that is disposed at a first side of the impeller along an axial direction and includes a plurality of vanes, a stator disposed at one side of the guide vane along the axial direction, a rotor configured to rotate relative to the stator to thereby rotate the impeller, and a frame disposed at an outside of the stator in a radial direction and coupled to the stator. The frame includes a body that has a cylindrical shape, that is disposed at the outside of the stator, and that defines an air flow path, and a plurality of stator fixing parts that protrude from an inner surface of the body and are coupled to the stator. The plurality of stator fixing parts are inclined with respect to the axial direction.

Implementations according to this aspect can include one or more of the following features. For example, the plurality of vanes can be inclined with respect to the axial direction, where an inclination direction of the plurality of stator fixing parts with respect to the axial direction is substantially equal to an inclination direction of the plurality of vanes with respect to the axial direction. In some implementations, the electric motor assembly includes a first bearing disposed between the guide vane and the rotor in the axial direction, where the frame defines a first bearing accommodating portion that receives the first bearing.

In some implementations, the frame can define a first bearing accommodating portion that receives the first bearing. The frame can further include a plurality of bridges that are radially connected to an outer surface of the first bearing accommodating portion, where each of the plurality of bridges extends to one of the plurality of stator fixing parts. In some examples, the guide vane further includes a vane hub, where the plurality of vanes are disposed at a circumference of the vane hub and spaced apart from one another in a circumferential direction of the vane hub. The vane hub can define a penetrating portion that receives the first bearing accommodating portion.

In some examples, the frame can include a plurality of bridges that are radially connected to an outer surface of the first bearing accommodating portion. The vane hub can further define a plurality of bridge accommodating portions that are recessed in the axial direction, where each of the plurality of bridge accommodating portions receives one of the plurality of bridges along the axial direction. In some examples, each of the plurality of bridges can include a vane hub contact section that radially protrudes from the body of the frame and is in contact with the vane hub, and a vane hub coupling section that is inclined with respect to the vane hub contact section and axially protrudes from the vane hub contact section. The vane hub coupling section can be coupled to and overlap with the vane hub in the axial direction.

In some examples, each of the plurality of bridges includes a fixing member coupling portion that receives a fixing member that has passed through the vane hub.

In some implementations, the electric motor assembly can further include a second bearing disposed away from the impeller, where the rotor is disposed between the impeller and the second bearing in the axial direction, and a bracket that accommodates and supports the second bearing. In some examples, the bracket can be coupled to the frame.

In some examples, the frame can include a plurality of legs that are coupled to the bracket, where each of the plurality of legs protrudes outside one of the plurality of stator fixing parts in the axial direction. In some examples, each of the plurality of legs can have a first side surface that extends from a circumference of the body, where the first side surface is inclined with respect to the axial direction.

In some examples, each of the plurality of legs can have a second side surface that extends from the circumference of the body and is spaced apart from the first side surface in a circumferential direction of the body, where the second side surface extends further in the circumferential direction relative to one of the plurality of stator fixing parts. In some examples, each of the plurality of legs can have a first side surface that is inclined with respect to the axial direction and a second side surface that is in parallel to the axial direction.

In some implementations, the electric motor assembly can include a second bearing disposed away from the impeller, where the rotor is disposed between the second bearing and the impeller in the axial direction, and a bracket that defines a second bearing accommodating portion receiving the second bearing. The bracket can include a plurality of frame coupling parts that radially protrude from an outer surface of the second bearing accommodating portion and are coupled to the frame. The frame can include a plurality of legs, where each of the plurality of legs protrudes outside one of the plurality of stator fixing parts in the axial direction and being coupled to the bracket.

In some examples, an axial length of the plurality of legs can be greater than an axial length of the plurality of stator fixing parts in the axial direction. Each of the frame coupling parts of the bracket can include a leg contact portion that is in contact with an end of one of the plurality of legs, and a stator fixing part contact portion that is in contact with an end of one of the plurality of stator fixing parts.

In some implementations, the electric motor assembly can include a bracket disposed away from the impeller, where the rotor is disposed between the bracket and the impeller in the axial direction. The bracket can define a fixing member coupling portion that extends therethrough in the axial direction and that is configured to receive a fixing member. Each of the plurality of stator fixing parts can include a female thread portion that is coupled to the fixing member.

In some implementations, each of the plurality of stator fixing parts can include a first side surface that has a linear shape and is inclined with respect to the axial direction, and a second side surface that has a curved shape and is spaced apart from the first side surface in a circumferential direction of the body. The first side surface and the second side surface extend away from the body, and a circumferential width between the first side surface and the second side surface increases along the axial direction.

In some implementations, the electric motor assembly can include an impeller housing that accommodates the impeller and has an air inlet that faces a second side of the impeller opposite to the first side of the impeller. In some examples, the impeller housing defines an impeller accommodating portion that accommodates the impeller, a vane accommodating portion that accommodates the guide vane, and a frame accommodating portion that accommodates one side of the frame and is coupled to the frame.

In some examples, the plurality of stator fixing parts can disposed to be inclined with respect to the axial direction so as to correspond to the rotational component of air moved by the impeller. Accordingly, formation of a flow stagnant zone of air moved by the impeller may be suppressed to thereby reduce an air flow loss. This may lead to performance improvement.

In some examples, the occurrence of air flow loss due to the rotational component of air moved by the impeller can be suppressed.

In some examples, the first bearing can be securely supported to thereby suppressing transverse displacement of the first bearing.

In some implementations, where the frame includes a plurality of bridges radially connected to an outer surface of the first bearing accommodating portion, and the plurality of bridges may be formed to correspond to the plurality of stator fixing parts, a flow loss of air moved by the impeller may be reduced.

In some implementations, as the vane hub and the first bearing overlap with each other in the axial direction, an axial length of the electric motor assembly may be reduced. In some implementations, as the vane hub and the frame overlap with each other in the axial direction, an axial length of the electric motor may be reduced, and transverse displacement (clearance) may be suppressed.

In some implementations, an axial clearance between the vane hub and the frame can be eliminated or reduced. In some implementations, as the first bearing and the second bearing are provided on both sides of the rotor along the axial direction, a transverse clearance of the rotor can be eliminated or reduced. Accordingly, an air gap between the stator and the rotor can be uniformly or constantly maintained, and the output of the electric motor assembly can be enhanced.

In some implementations, where the bracket is coupled to the frame, predetermined or preset positions of the rotor, and the first bearing and the second bearing disposed on the both sides of the rotor with respect to the stator can be securely maintained. In some implementations, the bracket can be supported by the plurality of stator fixing parts and the plurality of legs, and thus, a support force of the frame and the bracket may be increased.

In some implementations, where the plurality of legs each have one side surface along a circumferential direction that is inclined with respect to the axial direction so as to correspond to the plurality of stator fixing parts, flow resistance of air moved by the impeller may be suppressed.

In some implementations, where the plurality of legs each have another side surface along a circumferential direction that extends in the circumferential direction with respect to the plurality of stator fixing parts, radial diffusion of air moved by the impeller may be suppressed. As a result, axial flow of air moved by the impeller can be increased, leading to performance improvement.

In addition, as support strength of the plurality of legs is increased, transverse displacement of the bracket can be further suppressed.

In some implementations, where the plurality of legs each have one side surface inclined with respect to the axial direction and another side surface in parallel with the axial direction, the plurality of legs may be limited from being excessively extended in the circumferential direction.

In some implementations, an increase in air flow resistance caused by the bracket may be effectively suppressed. In some implementations, the plurality of legs may be longer in axial length than the plurality of the stator fixing parts with respect to the body. Accordingly, transverse (radial) displacement of the bracket that is coupled to ends of the plurality of stator fixing parts and ends of the plurality legs can be suppressed.

In some examples, the frame and the bracket can be closely coupled to each other in the axial direction. As a result, they may not be arbitrarily separated from each other. In some implementations, an increase in flow resistance due to the rotational component of air moved by the impeller may be suppressed, and a contact area with the bracket that is coupled to the plurality of stator fixing parts may be increased to thereby enhance a coupling force.

In some implementations, the air inlet of the impeller housing can enable air in a region at the front of the impeller to be smoothly suctioned in and to flow smoothly. In some implementations, the frame can allow the impeller housing to be securely supported at a predetermined position, enabling smooth air intake and smooth air flow to be archived. Further, noise generation may be suppressed.

DETAILED DESCRIPTION

Figure 1:
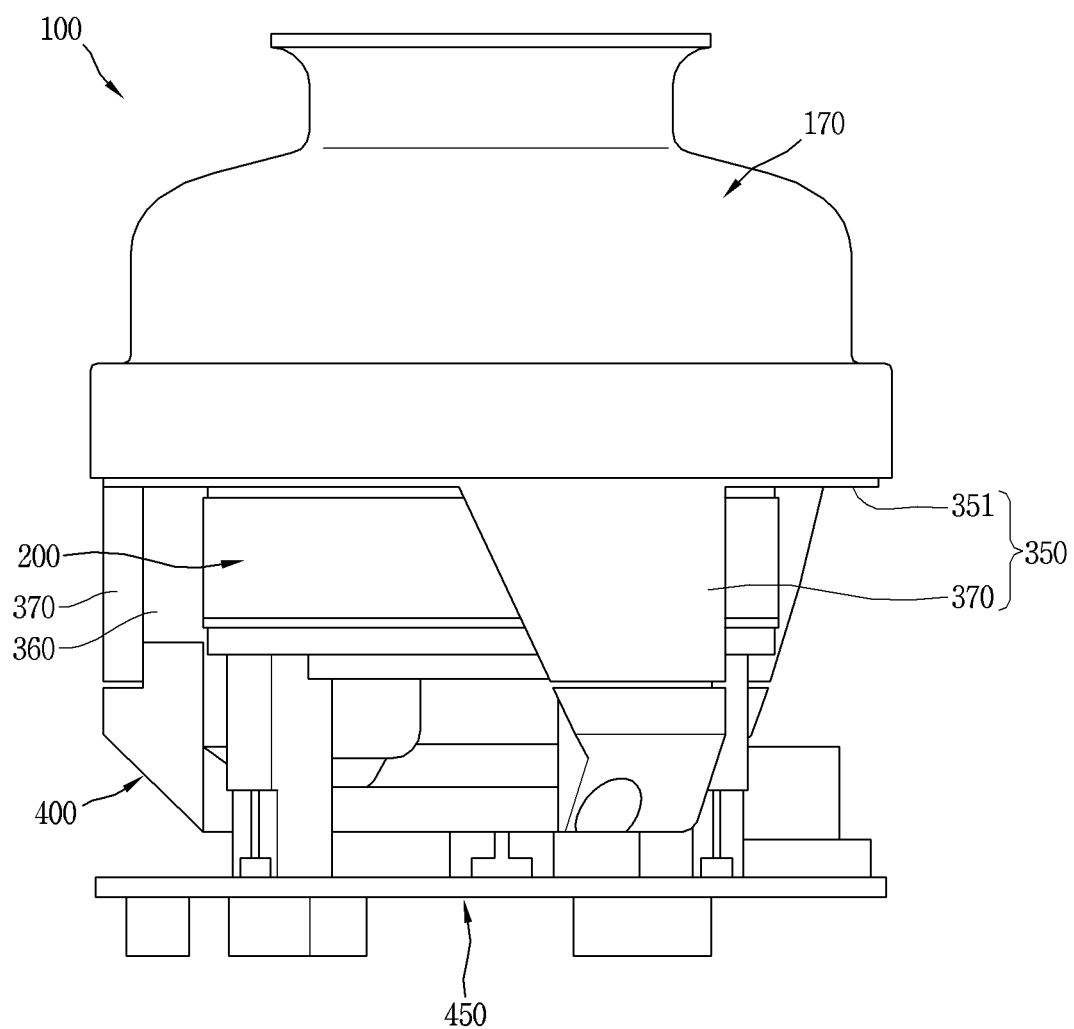
FIG. 1 is a front view showing an example of an electric motor assembly.

Hereinafter, one or more implementations of the present disclosure will be described in detail with reference to the accompanying drawings. Herein, the same or similar elements are designated with the same or similar reference numerals, and a redundant description has been omitted. Singular expressions include plural expressions unless the context clearly indicates otherwise. In describing the present disclosure, if a detailed explanation for a related known technology or construction is considered to unnecessarily divert the main point, such explanation has been omitted but would be understood by those skilled in the art. Also, it should be understood that the accompanying drawings are merely illustrated to easily explain the concept, and therefore, they should not be construed to limit the technological concept disclosed herein by the accompanying drawings.

Figure 2:
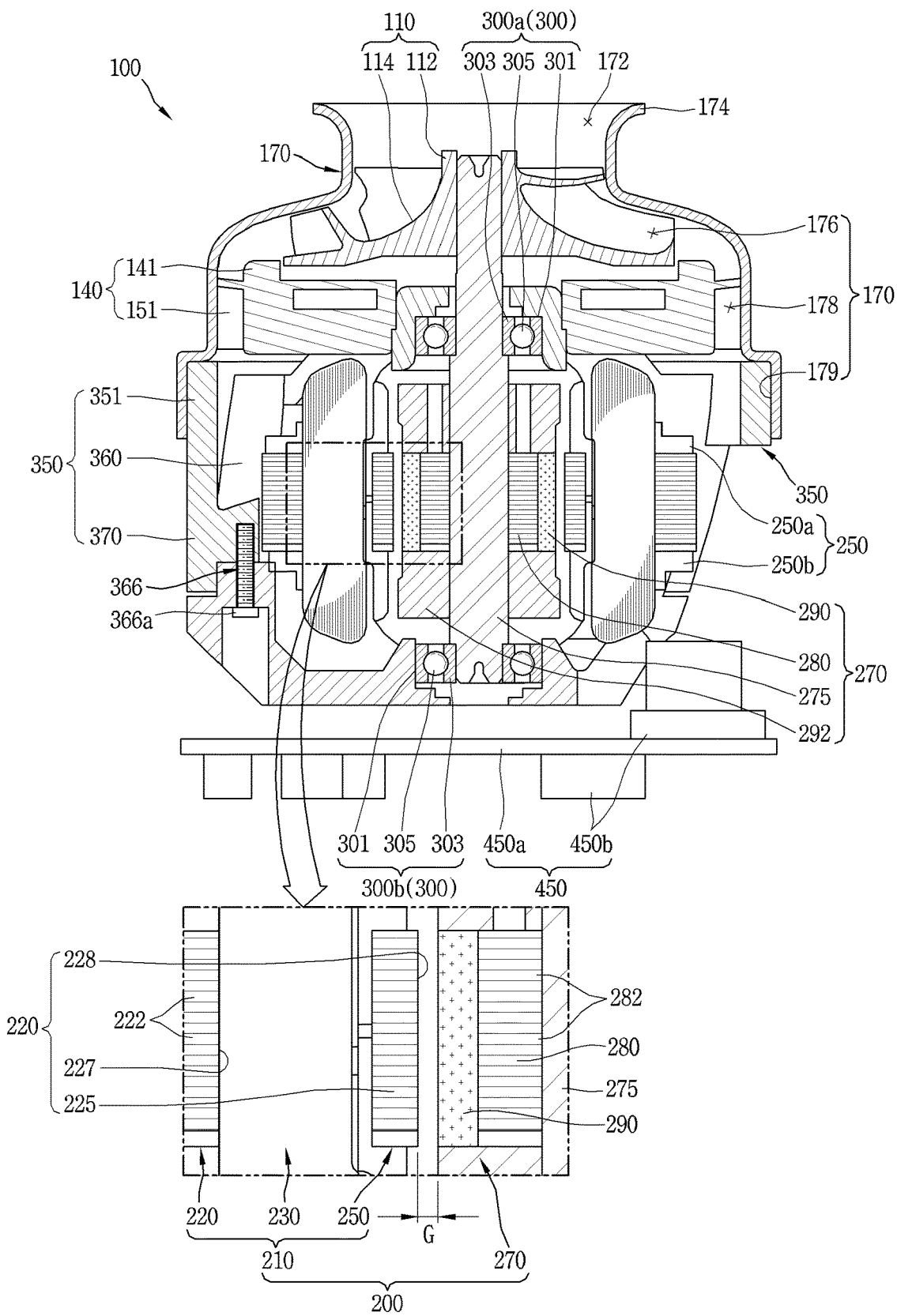
FIG. 2 is a longitudinal cross-sectional view showing the electric motor assembly of FIG. 1.
Figure 3:
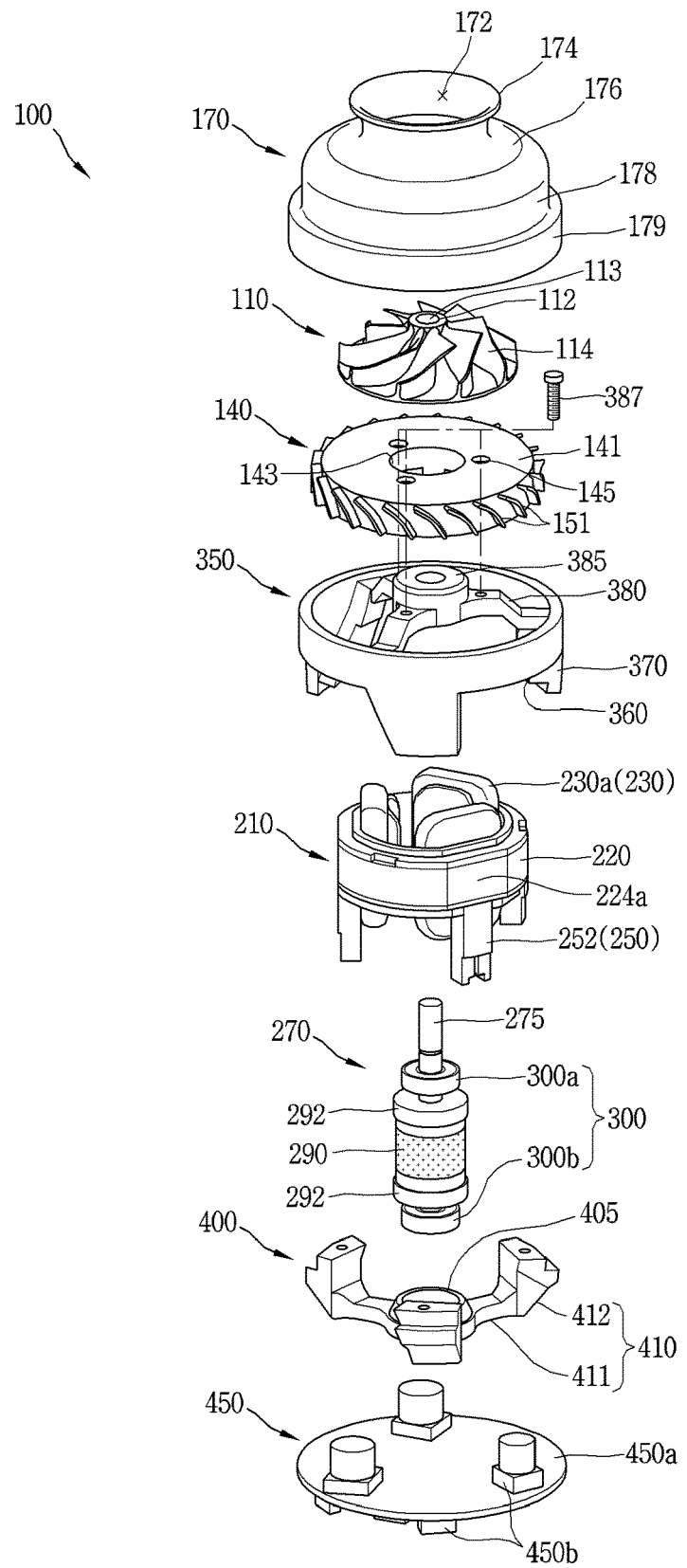
FIG. 3 is an exploded perspective view showing the electric motor assembly of FIG. 1.

FIG. 1 is a front view showing an example of an electric motor assembly, FIG. 2 is a longitudinal cross-sectional view showing the electric motor assembly of FIG. 1, and FIG. 3 is an exploded perspective showing the electric motor assembly of FIG. 1. As illustrated in FIGS. 1 to 3, an electric motor assembly 100 includes an impeller 110, a stator 210, a rotor 270, and a frame 350.

In some implementations, the impeller 110 can be configured to suction air in an axial direction and discharge the air in a radial direction during rotation.

The impeller 110 can include a hub 112 and a plurality of blades 114 disposed in a circumference of the hub 112. The hub 112 can include at its center a rotating shaft coupling portion to which a rotating (or rotational) shaft 275 is coupled.

In some implementations, the impeller 110 can be configured to rotate counterclockwise in the drawing, for example. In some implementations, the impeller 110 can be configured to rotate clockwise, counterclockwise, or both.

When the impeller 110 rotates, air substantially flows in the axial direction, and the impeller 110 has a rotation or rotational direction component that is rotated along a rotation direction of the impeller 110.

In some implementations, referring to FIGS. 2 and 3, air suctioned and discharged by the impeller 110 is moved to be downwardly inclined in a right direction in the drawing as it flows to a downstream side (lower side in the drawing) along the axial direction.

An impeller housing 170 is provided at an outside of the impeller 110.

The impeller housing 170 has, for example, a cylindrical shape with an accommodation space formed therein.

The impeller housing 170 can have a cylindrical shape with a hollow center, for example.

An air inlet 172 is formed through a central portion (or part) of the impeller housing 170, so as to allow air to be suctioned therein.

The impeller housing 170 has a diameter that gradually increases along the axial direction.

The air inlet 172 of the impeller housing 170 includes a bell mouth 174 having a diameter (inner diameter) that gradually increases toward an upstream side along a flow direction of air.

Accordingly, air can be smoothly introduced into the impeller housing 170 when the impeller 110 rotates.

The impeller housing 170 can include, for example, an impeller accommodating portion 176 in which the impeller 110 is accommodated, a vane accommodating portion 178 in which a plurality of vanes 151 to be described hereinafter is accommodated, and a frame accommodating portion 179 to which the frame 350 is accommodated and coupled.

The impeller housing 170 can be formed such that a diameter (inner diameter) of the vane accommodating portion 178 is greater than a diameter (inner diameter) of the impeller accommodating portion 176, and a diameter (inner diameter) of the frame accommodating portion 179 is greater than the diameter (inner diameter) of the vane accommodating portion 178.

A drive (or driving) motor 200 that allows the impeller 110 to be rotatably driven is provided at one side (lower side in the drawing) of the impeller 110 along the axial direction.

The drive motor 200 includes, for example, the stator 210 and the rotor 270 that is rotatable with respect to the stator 210 and is configured to rotate the impeller 110.

The stator 210 can include a stator core 220 and a stator coil 230 wound on the stator core 220.

The stator core 220 can be formed by stacking a plurality of electrical steel plates 222 in an insulating manner, for example.

The plurality of electrical steel plates 222 of the stator core 220 is provided with a rotor accommodation space 228 in which the rotor 270 is rotatably accommodated. The rotor 270 is ratably accommodated in the rotor accommodation space 228 with a predetermined air gap G from the stator 210.

A flat surface 224a with a rectangular shape is formed on an outer surface of the stator 210 (stator core 220) in a cut manner.

Accordingly, a space (air flow cross-sectional area) between the frame 350 and the stator 210 can be increased.

The flat surface 224a of the stator 210 can be provided in plurality to be spaced apart from one another along a circumferential direction, for example.

The flat surfaces 224a of the stator 210 can be spaced apart from each other by the same angle (interval), for example.

The outer surface of the stator 210 (stator core 220) can include three flat surfaces 224a so that three circumferential surfaces 224b having an arcuate shape and three flat surfaces 224a are alternately arranged.

Each of the plurality of electrical steel plates 222 of the stator core 220 includes a plurality of teeth 225 protruding in a radial direction and provided therein with the rotor accommodation space 228, and a plurality of slots 227 formed between the teeth 225.

For example, the plurality of teeth 225 and slots 227 are alternately disposed, and the stator 210 is provided with three teeth 225 and three slots 227.

The flat surfaces 224a of the stator 210 can be, for example, formed at outside of the teeth 225 of the stator 210, respectively.

The stator coil 230 can be implemented as concentrated winding intensively wound around the teeth 225, for example.

The stator coil 230 can include a plurality of coil portions 230a that respectively corresponds to phases (U phase, V phase, and W phase) of a three-phase AC power supply, for example. In some implementations, the plurality of coil portions 230a can be three in number. As each of the plurality of coil portions 230a is intensively wound around one of the plurality of teeth 225, the plurality of coil portions 230a can each have two ends. In some examples, one end of each coil portion 230a can be connected to a power source, and another end of each coil portion 230a can be connected at one point (neutral point).

The stator 210 includes an insulator 250 for insulating the stator core 220 and the stator coil 230.

The insulator 250 can be configured to block an inner surface and both axial end surfaces of the stator core 220.

Accordingly, a short circuit caused by direct contact between the stator coil 230 and the stator core 220 can be suppressed.

The insulator 250 can be configured to block inner surfaces of the plurality of slots 227 of the stator core 220, and circumferential surfaces (upper, lower, and both side (lateral) surfaces) of the plurality of teeth 225 for insulating the stator coil 230.

The insulator 250 can be divided into two parts or portions so as to be coupled to face each other along the axial direction, for example. In some implementations, the insulator 250 can include an upper insulator 250a that is coupled at an upper side of the stator core 220 and a lower insulator 250b that is coupled at a lower side of the stator core 220 in the drawing.

The insulator 250 is provided with PCB coupling portions 252 each extending in the axial direction and coupled to a PCB 450 to be described hereinafter.

One ends (power lines) of the coil portions 230a of the stator coil 230 are connected to the PCB coupling portions 252, respectively. The one ends (power lines) of the coil portions 230a that are respectively connected to the PCB coupling portions 252 can be connected to respective phases (U-phase, V-phase, and W-phase) of an electric circuit of the PCB 450 in a corresponding manner.

Accordingly, AC power can be supplied to each of the coil portions 230a of the stator coil 230.

The PCB coupling portions 252 can be spaced apart from one another along the circumferential direction, for example.

The PCB coupling portions 252 can be three in number, for example.

The insulator 250 can be provided with a neutral point connecting portion 254 (see FIGS. 15 and 16) for forming a neutral point that integrally connects the other ends of the three coil portions 230a together.

The rotor 270 can include the rotating shaft 275, the rotor core 280 that rotates about the rotating shaft 275, and a permanent magnet 290 that is provided at the rotor core 280. In some examples, where a size of the rotor 270 is relatively small, the rotor core 280 may not be provided, and instead, the permanent magnet 290 can be coupled to the rotating shaft 275.

The rotor core 280 can be formed by, for example, stacking the plurality of electric steel plates 282 in an insulating manner. The rotor core 280 can have an outer surface with a circular shape, and the permanent magnet 290 can be coupled to the outer surface (circumferential surface) of the rotor core 280. The permanent magnet 290 can be configured such that different magnetic poles (N poles and S poles) are alternately disposed along the circumferential direction.

The rotor 270 can include end plates 292 respectively coupled to both ends of the rotor core 280 along the axial direction.

The end plates 292 can each have an increased outer diameter relative to an outer diameter of the rotor core 280.

The end plates 292 can be in contact with both ends of the permanent magnet 290, respectively.

Accordingly, axial separation of the permanent magnet 290 can be suppressed.

The rotating shaft 275 can extend to both sides of the rotor core 280 along the axial direction.

The rotating shaft 275 can be provided with a plurality of bearings 300 disposed at both sides of the rotor 270 (rotor core 280), respectively.

Accordingly, transverse displacement of the rotor 270 can be suppressed.

With this configuration, transverse displacement of the rotor 270 can be suppressed, allowing the air gap G between the stator 210 and the rotor 270 to be constantly or uniformly maintained.

As a result, vibration and noise generated when the rotor 270 rotates can be suppressed, and the output of the electric motor assembly 100 can be enhanced.

The plurality of bearings 300 can include a first bearing 300a that is disposed between the impeller 110 and the rotor core 280, and a second bearing 300b that is disposed at an opposite side of the first bearing 300a with the rotor core 280 interposed therebetween.

The first bearing 300a and the second bearing 300b can be configured as ball bearings, for example.

The first bearing 300a and the second bearing 300b can each include, for example, an outer ring 301, an inner ring 303 concentrically disposed inside the outer ring 301, and a plurality of balls 305 disposed between the outer ring 301 and the inner ring 303.

The rotating shaft 275 extends further from the first bearing 300a along the axial direction, and an impeller coupling portion 275a to which the impeller 110 is coupled is provided at an end (or end portion) of the rotating shaft 275.

The impeller coupling portion 275a is formed at one end (upper end in the drawing) of the rotating shaft 275.

A guide vane 140 that guides air moved by the impeller 110 is provided at one side of the impeller 110 along the axial direction.

The guide vane 140 includes, for example, a vane hub 141 having a circumferential surface and the plurality of vanes 151 disposed to be spaced apart from one another on a circumferential surface of the vane hub 141.

The plurality of vanes 151 is disposed to be inclined with respect to the axial direction.

In detail, the plurality of vanes 151 is disposed to be inclined with respect to the axial direction so as to correspond to the rotational component of air moved by the impeller 110. Each of the plurality of vanes 151 is downwardly inclined to the right substantially.

The vane hub 141 has a disk (or disc) shape with a relatively thin thickness relative to its diameter.

The vane hub 141 has an outer diameter greater than a rotation diameter of the impeller 110, for example.

The plurality of vanes 151 can each include, for example, an upstream section 151a and a downstream section 151b along the flow direction of air.

The upstream sections 151a and the downstream sections 151b of the plurality of vanes 151 can have different inclination angles with respect to the axial direction.

Each of the plurality of vanes 151 can be configured such that the upstream section 151a is more inclined than the downstream section 151b with respect to the axial direction.

In some examples, the upstream section 151a can have a curved shape, and the downstream section 151b can have a shape relatively close to a linear shape, for example.

The frame 350 is coupled to an outer side of the stator 210.

The frame 350 can include a body 351 disposed at an outside of the stator 210 and having an air flow path formed therein, and a plurality of stator fixing parts 360 protruding from an inner surface of the body 351 and coupled to the stator 210.

The body 351 can have an inner diameter greater than an outer diameter of the stator 210, for example.

The plurality of stator fixing parts 360 can each protrude from the inner surface of the body 351 so as to be coupled to the outer surface of the stator 210 in a surface contact manner, for example.

The plurality of stator fixing parts 360 can be formed to correspond to the plurality of teeth 225 so as to be disposed between the teeth 225 of the stator 210, for example.

Accordingly, an occurrence of flow loss of air moved by rotation of the impeller 110 can be suppressed.

The plurality of stator fixing parts 360 can be three in number, for example.

The plurality of stator fixing parts 360 is disposed to be inclined with respect to the axial direction so as to correspond to the rotational component of air moved by the impeller 110.

The plurality of stator fixing parts 360 and the plurality of vanes 151 can be disposed to be inclined in the same direction.

Accordingly, an increase in flow resistance of air moved by the impeller 110 can be suppressed.

Thus, an air flow loss caused by the plurality of vanes 151 and stator fixing parts 360 can be suppressed to thereby enhance air flow performance of the electric motor assembly 100.

The frame 350 is provided with a first bearing accommodating portion 385 to which the first bearing 300a is accommodated and coupled.

The frame 350 includes a plurality of bridges 380 each having one end connected to the body 351 and another end connected to the first bearing accommodating portion 385.

The plurality of bridges 380 can be radially connected to the first bearing accommodating portion 385, respectively.

The plurality of bridges 380 can be formed at upper ends of the stator fixing parts 360, respectively.

Accordingly, the flow loss of air moved by rotation of the impeller 110 can be suppressed.

The plurality of bridges 380 can be three in number, for example.

The plurality of bridges 380 can be coupled to the guide vane 140, for example.

The plurality of bridges 380 can each include, for example, a vane hub contact section 380a that radially protrudes from the body 351 of the frame 350 and is in contact with the vane hub 141.

The plurality of bridges 380 can each include, for example, a vane hub coupling section 380b that is coupled to the vane hub 141 in an overlapping manner.

As the first bearing accommodating portion 385 of the frame 350 and the guide vane 140 are coupled to each other in an overlapping manner along the axial direction, an axial length of the electric motor assembly 100 can be reduced to that much.

With this configuration, a distance between the impeller 110 and the rotor 270 can be reduced, and thus, transverse displacement during rotation of the impeller 110 can be suppressed.

The vane hub coupling section 380b can be bent to protrude outward from the vane hub contact section 380a along the axial direction.

In some examples, the first bearing accommodating portion 385 can protrude further from the vane hub coupling section 380b to a predetermined length in the axial direction.

Accordingly, the first bearing 300a accommodated in the first bearing accommodating portion 385 can be disposed closer to the impeller 110.

As the impeller 110 is supported in a manner of suppressing the transverse displacement, the impeller 110 can be rotated in a more stable or secure manner.

The plurality of bridges 380 can each include a fixing member coupling portion 382 to which a fixing member 387 (see FIG. 3) is coupled. For example, the fixing member 387 can include a male threaded portion, and the fixing member coupling portion 382 can have a female threaded portion, allowing them to be coupled to each other.

A penetrating portion (e.g., through-hole) 143 in which the first bearing accommodating portion 385 is inserted can be formed through a central portion of the guide vane 140 in the axial direction.

A plurality of fixing member coupling portions 145 is formed in a circumference of the penetrating portion 143 of the guide vane 140 in a penetrating manner, so as to allow the fixing members 387 to be coupled along the axial direction.

A bracket 400 that accommodates and supports the second bearing 300b is provided at one side (lower side in the drawing) of the rotor 270 along the axial direction.

The bracket 400 includes, for example, a second bearing accommodating portion 405 in which the second bearing 300b is accommodated, and a frame coupling part 410 having one end connected to an outer surface of the second bearing accommodating portion 405 and another end connected to the frame 350.

The PCB 450 is disposed at one side (lower side in the drawing) of the bracket 400.

The PCB 450 can be electrically connected to the stator coil 230 and configured to supply three-phase AC power with different frequencies, for example.

Accordingly, a rotational speed (revolutions per minute (RPM)) of the rotor 270 can be variously adjusted.

The PCB 450 can have, for example, a disk shape.

The PCB 450 can be supported by being coupled to the PCB coupling portions 252 of the insulator 250, for example.

The PCB 450 can have an outer diameter that corresponds to the outer diameter of the stator 210, for example. The PCB 450 can include, for example, a substrate 450a and a plurality of circuit parts (or components) 450b that is provided at the substrate 450a and constitutes an electric circuit.

Figure 4:
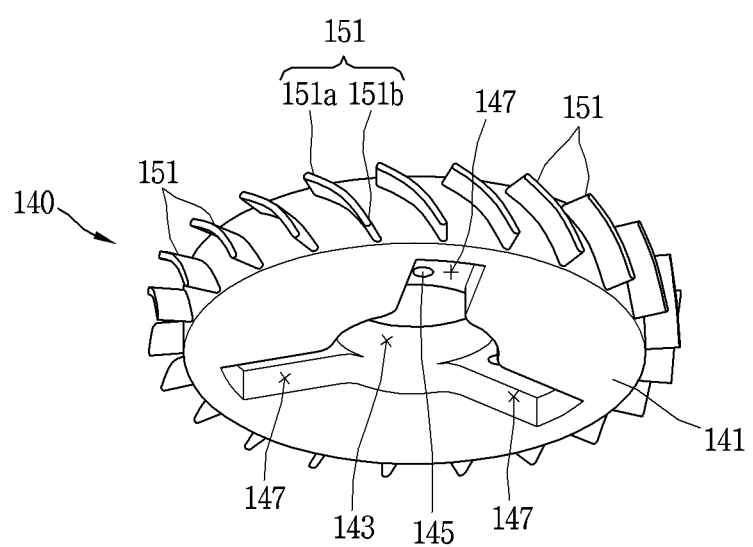
FIG. 4 is a bottom perspective view showing an example of a guide vane of FIG. 3.

FIG. 4 is a bottom perspective view showing an example of a guide vane of FIG. 3. As illustrated in FIG. 4, the penetrating portion 143 is formed through the central portion of the guide vane 140. Bridge accommodating portions 147 are provided in a circumference of the penetrating portion 143 in a recessed manner so as to allow the plurality of bridges 380 of the frame 350 to be inserted therein in the axial direction. The vane hub coupling sections 380b of the plurality of bridges 380 are insertedly coupled to the bridge accommodating portions 147, respectively.

The fixing member coupling portions 382 can be formed through the bridge accommodating portions 147, respectively.

Figure 5:
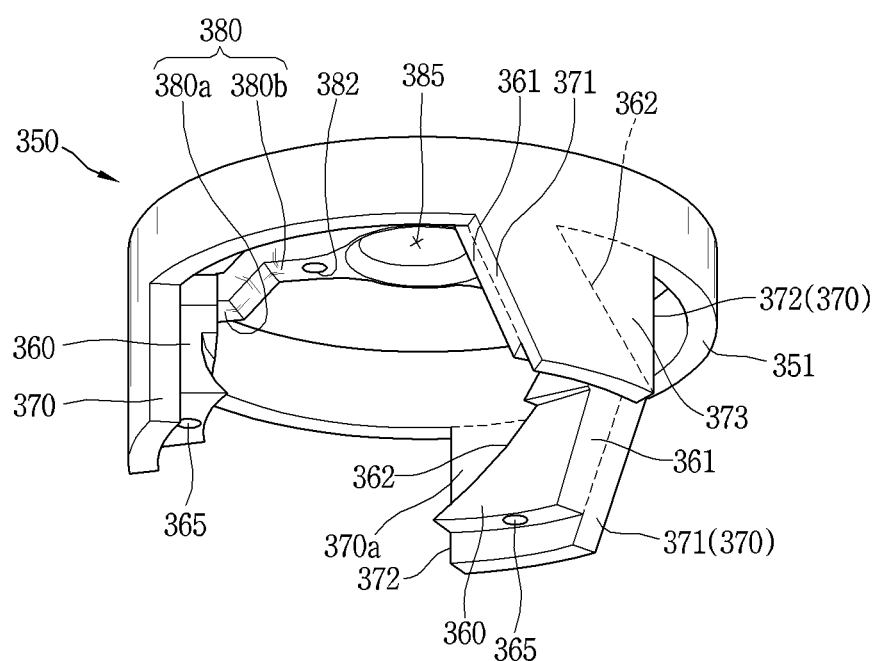
FIG. 5 is an enlarged perspective view showing an example a frame of FIG. 3.
Figure 6:
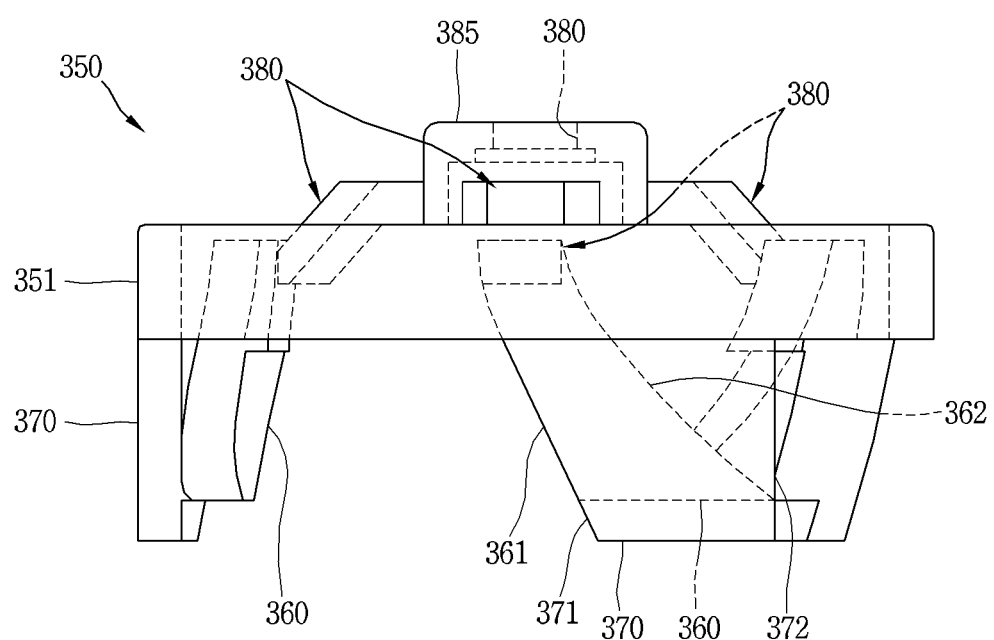
FIG. 6 is a front view showing the frame of FIG. 5.
Figure 7:
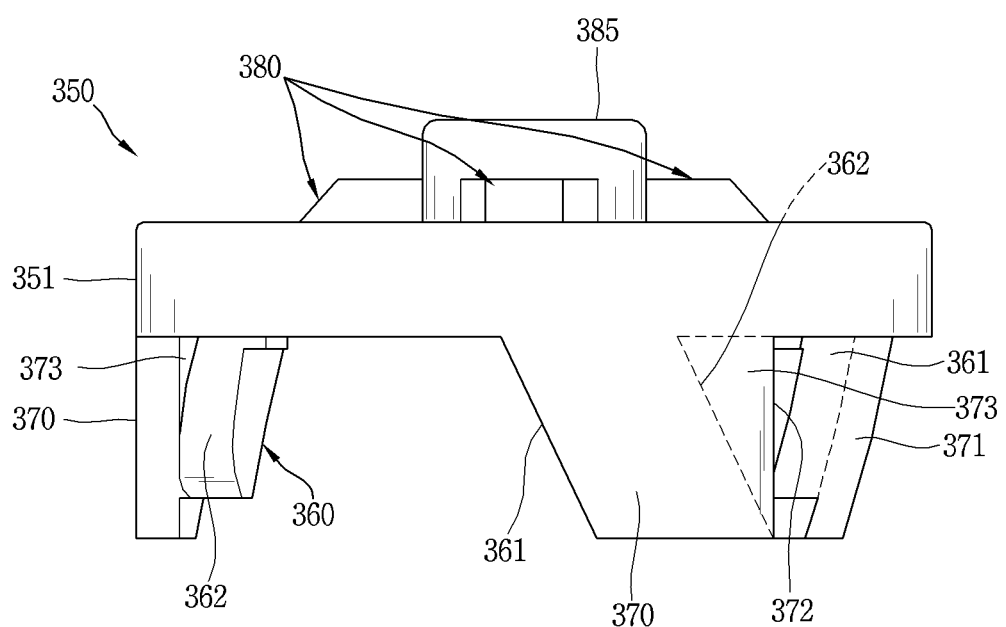
FIG. 7 illustrates an example of an outer surface of the frame of FIG. 6.
Figure 8:
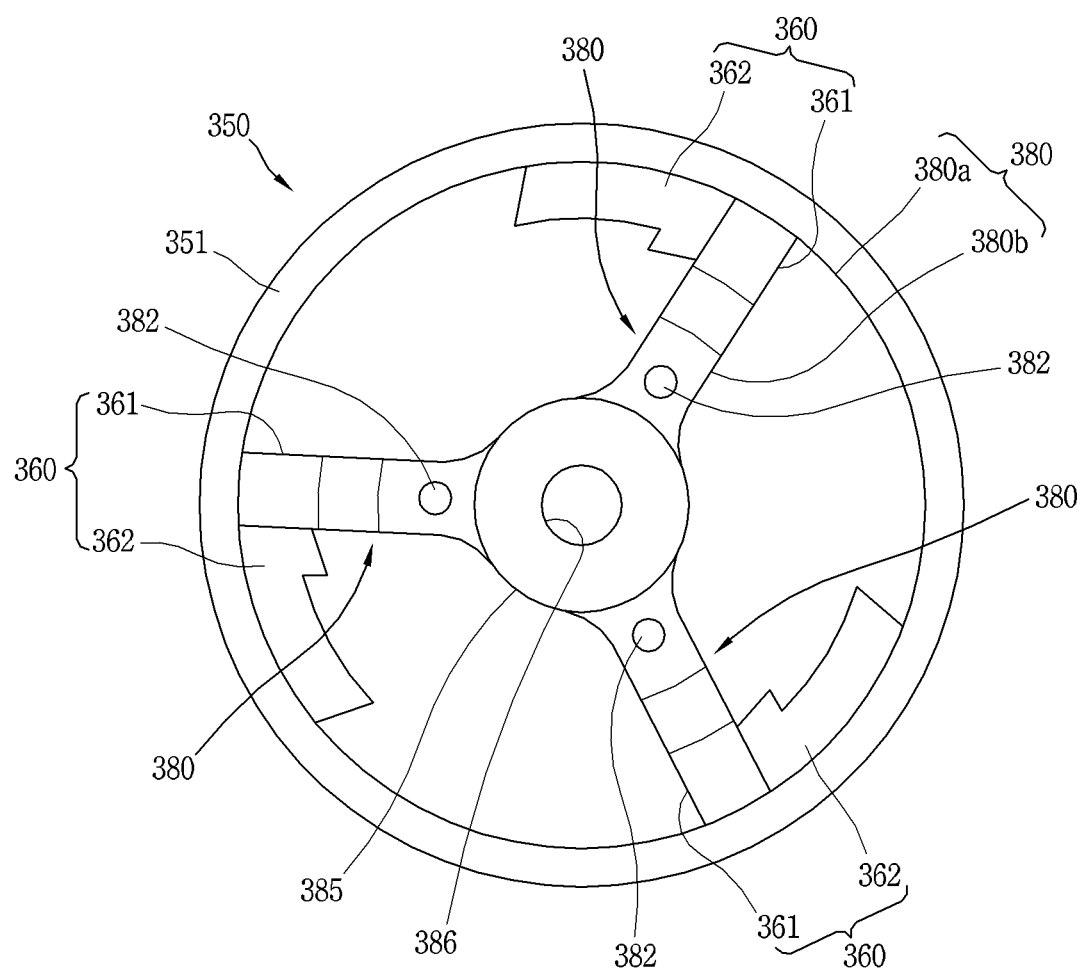
FIG. 8 is a planar view showing the frame of FIG. 6.
Figure 9:
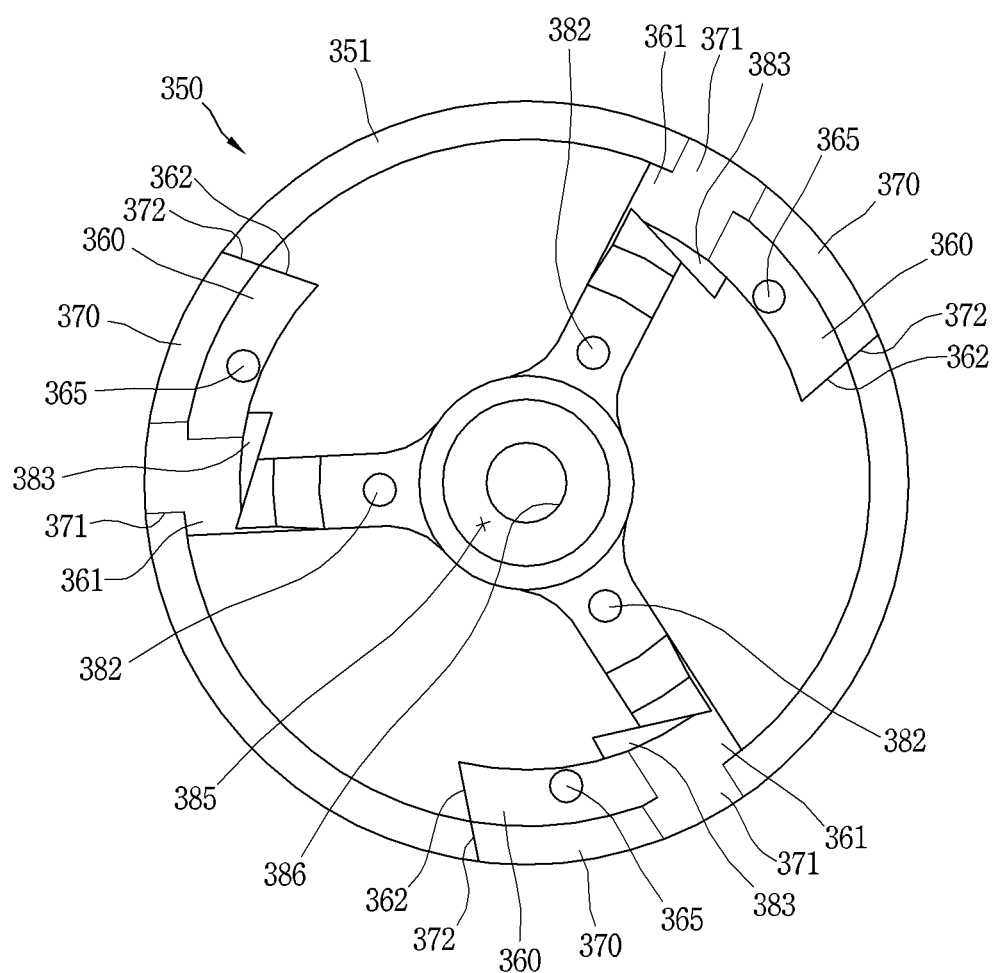
FIG. 9 is a bottom view showing the frame of FIG. 6.

FIG. 5 is an enlarged perspective view showing an example of a frame of FIG. 3, FIG. 6 is a front view showing an example of a frame of FIG. 5, and FIG. 7 illustrates an example of an outer surface of the frame of FIG. 6. As illustrated in FIG. 5, the frame 350 includes the body 351 with a ring shape and the plurality of stator fixing parts 360 protruding from the inner surface of the body 351 and extending in the axial direction.

The body 351 can be concentrically disposed with respect to the stator 210.

The body 351 is spaced apart from the stator 210 in the axial direction.

The impeller housing 170 can be coupled to an outer surface of the body 351.

The body 351 and the impeller housing 170 can be disposed concentrically with respect to each other.

The first bearing accommodating portion 385 is provided at a central portion of the body 351, and the plurality of bridges 380 is provided between the body 351 and the first bearing accommodating portion 385.

The body 351 and the first bearing accommodating portion 385 can be concentrically disposed with respect to each other.

The first bearing accommodating portion 385 protrudes from the body 351 along the axial direction.

The plurality of stator fixing parts 360 is provided inside the body 351.

An inner surface (end circumferential surface along the radial direction) of the stator fixing part 360 is in surface contact with the outer surface of the stator 210 (stator core 220).

The inner surface of the stator fixing part 360 has, for example, a cross section with an arcuate shape so as to be in surface contact with a circumferential surface of the stator core 220.

The plurality of stator fixing parts 360 is formed to correspond to the plurality of bridges 380.

The plurality of stator fixing parts 360 is respectively formed at one side (lower side in the drawing) of the plurality of bridges 380 along the axial direction.

In some implementations, three bridges 380 are provided, and accordingly, three stator fixing parts 360 are provided to correspond to the three bridges 380.

Each of the plurality of stator fixing parts 360 is disposed at one side (lower side in the drawing) of one of the plurality of bridges 380 inside the body 351.

The plurality of bridges 380 can be disposed at upper sides of the plurality of stator fixing parts 360, respectively.

Accordingly, when the impeller 110 is driven, air flow resistance caused by the plurality of bridges 380 and stator fixing parts 360 can be minimized.

A stator contact portion 383 in contact with the stator 210 is formed at one side (lower side in the drawing) of each vane hub contact section 380a of each bridge 380.

The stator contact portion 383 is in contact with one end (upper end in the drawing) of the insulator 250 along the axial direction.

The stator contact portion 383 can have a triangular shape, for example.

The stator contact portions 383 can respectively protrude from the plurality of bridges 380 to one side along the circumferential direction.

The stator fixing parts 360 can each protrude from the inner surface of the body 351 so as to be in surface contact with the outer surface of the stator 210 (stator core 220).

One or both side (or lateral) surfaces of each of the stator fixing parts 360 can be inclined with respect to the axial direction so as to correspond to the rotational component of air moved by rotation of the impeller 110.

In some implementations, since the impeller 110 is configured to rotate counterclockwise in the drawing, of the both side surfaces of the stator fixing part 360, one side surface (first side surface) 361 where air moved by rotation of the impeller 110 reaches first is inclined downward to one side (in the right direction in the drawing).

Another side surface (second side surface) 362 of each of the stator fixing parts 360 can have a linear cross section or a curved cross section.

In some examples, the first side surface 361 of the stator fixing part 360 can be referred to as an "upstream end" and the second side surface 362 can be referred to as a "downstream end" with respect to a flow of air moved by the impeller 110.

The stator fixing part 360 can have a width that increases toward one side (lower side in the drawing) along the axial direction, for example.

In detail, the first side surfaces 361 of the stator fixing parts 360 can each have a linear cross section, and the second side surfaces 362 can each have a straight cross section or a curved cross section.

A circumferential width of the stator fixing part 360 can increase in the axial direction so that its one end (lower end in the drawing) is wider than its another end (upper end in the drawing).

Accordingly, a contact area with the bracket 400 can be increased, allowing a coupling force to be enhanced.

The another side surface (second side surface 362) of each of the stator fixing parts 360 can be inclined with respect to the axial direction, so as to correspond to the rotational component of air moved by the impeller 110.

As a result, an air flow stagnant zone (stagnation point) where air moved by the impeller 110 remains over an extended period can be significantly reduced in a downstream region of the stator fixing part 360 with respect to the flow of air moved by the impeller 110.

A fixing member coupling portion 365 is formed at an end (lower end) of each of the stator fixing parts 360 so that a fixing member 366 coupled to the bracket 400 in a manner of passing therethrough is coupled (see FIG. 2).

The fixing member coupling portions 365 of the stator fixing parts 360 can each include a female threaded portion so as to allow a male threaded portion of the fixing member 366 that has passed through the bracket 400 to be coupled thereto.

The body 351 can be provided with a plurality of legs 370, each formed at an outer side of one of the stator fixing parts 360 in a manner of extending along the axial direction.

In some implementations, like the first side surfaces 361 of the stator fixing parts 360, an upstream side (first side surface 371) of each of the plurality of legs 370 with respect to the flow direction of air moved by rotation of the impeller 110 is inclined with respect to the axial direction, so as to correspond to the rotational component of air moved by the impeller 110.

Accordingly, the flow loss of air moved by the impeller 110 can be significantly reduced.

The leg 370 can be integrally formed with the stator fixing part 360 (single body), for example.

As a result, strength of the stator fixing part 360 can be increased (reinforced).

Each of the plurality of legs 370 can have the same radial width as the body 351.

The plurality of legs 370 can be formed to correspond to the number of stator fixing parts 360.

In some implementations, the plurality of legs 370 can be three in number the same as the stator fixing parts 360.

Outer surfaces of the plurality of legs 370 can be disposed on an extended line of the outer surface of the body 351.

The outer surfaces of the plurality of legs 370 can each have an arcuate shape.

That is, each of the plurality of legs 370 can have an outer diameter the same as an outer diameter of the body 351.

The plurality of legs 370 can protrude from the body 351 to be longer than the stator fixing parts 360 in the axial direction.

Ends of the plurality of legs 370 can protrude longer than ends of the stator fixing parts 360 in a down direction (lower side) in the drawing.

The fixing member coupling portions 365 can be provided at ends (lower ends) of the stator fixing parts 360, respectively.

The fixing member coupling portion 365 of the stator fixing parts 360 can each include, for example, the female threaded portion so as to correspond to the male threaded portion of the fixing member 366.

A circumferential thickness of the leg 370 can be greater than a circumferential thickness of the stator fixing part 360.

This can allow a coupling force between the frame 350 and the bracket 400 to be increased.

With this configuration, a downstream side (second side surface 372) of the leg 370 can be located downstream than the second side surface 362 of the stator fixing part 360 with respect to the flow of air moved by rotation of the impeller 110.

The second side surface 372 of the leg 370 can be disposed along the axial direction, for example.

In some examples, a lower end width of the leg 370 can be equal to a lower end width of the stator fixing part 360, for example.

With this configuration, a portion having a substantially triangular shape that extends from an upper region of the stator fixing part 360 of the leg 370 in the circumferential direction is formed, and the portion of the leg 370 having the triangular shape can be defined as a reinforcing portion 373 since it increases overall support strength of the leg 370 (see FIG. 5).

Thus, a coupling force between the frame 350 and the bracket 400 can be enhanced.

In addition, as the reinforcing portion 373 suppresses radial diffusion of air that has passed through the body 355 by the impeller 110, allowing a straight component of air moved by the impeller 110 to be increased. As a result, performance of air flow in the axial direction by rotation of the impeller 110 can be enhanced.

Figure 10:
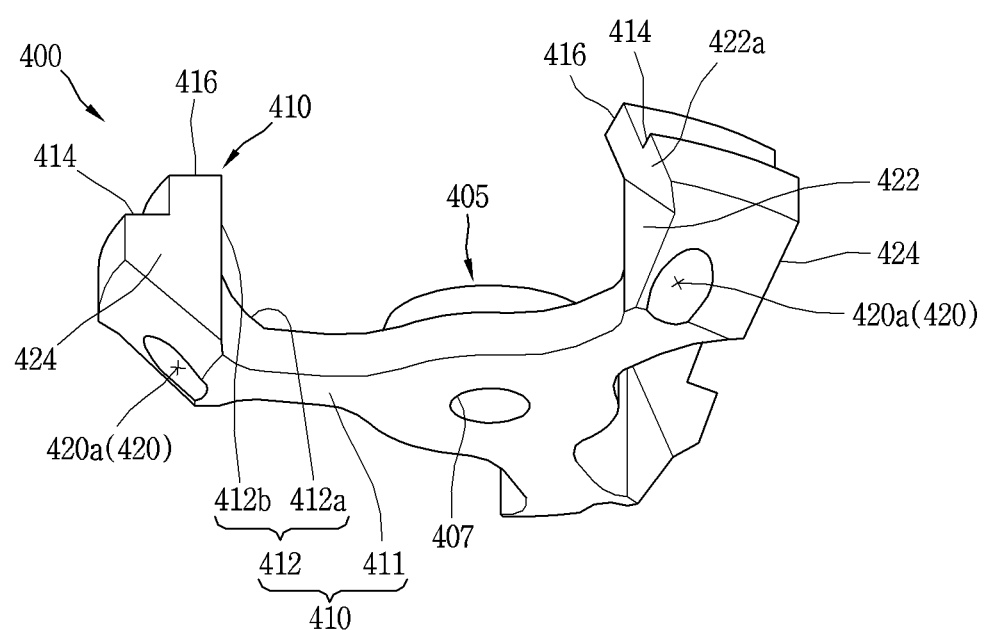
FIG. 10 is an enlarged perspective view showing an example of a bracket of FIG. 3.
Figure 11:
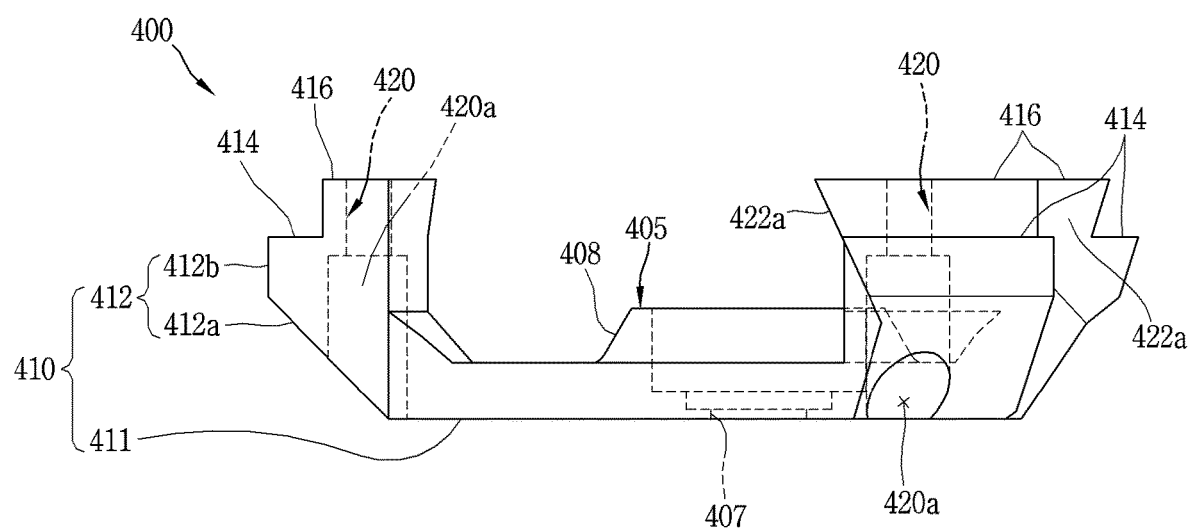
FIG. 11 is a front view showing the bracket of FIG. 10.
Figure 12:
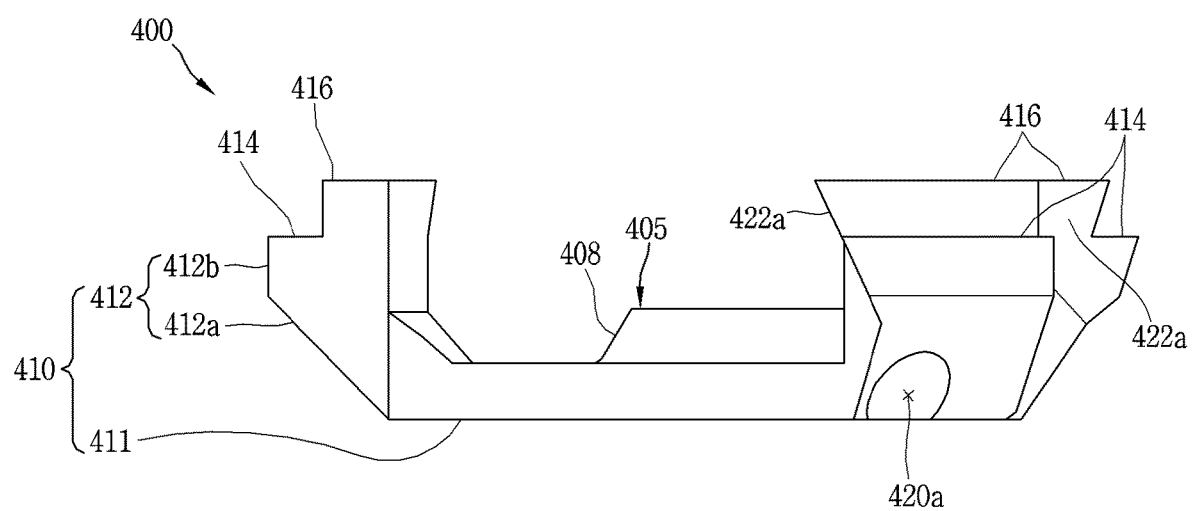
FIG. 12 illustrates an example of an exterior of the bracket of FIG. 11.
Figure 13:
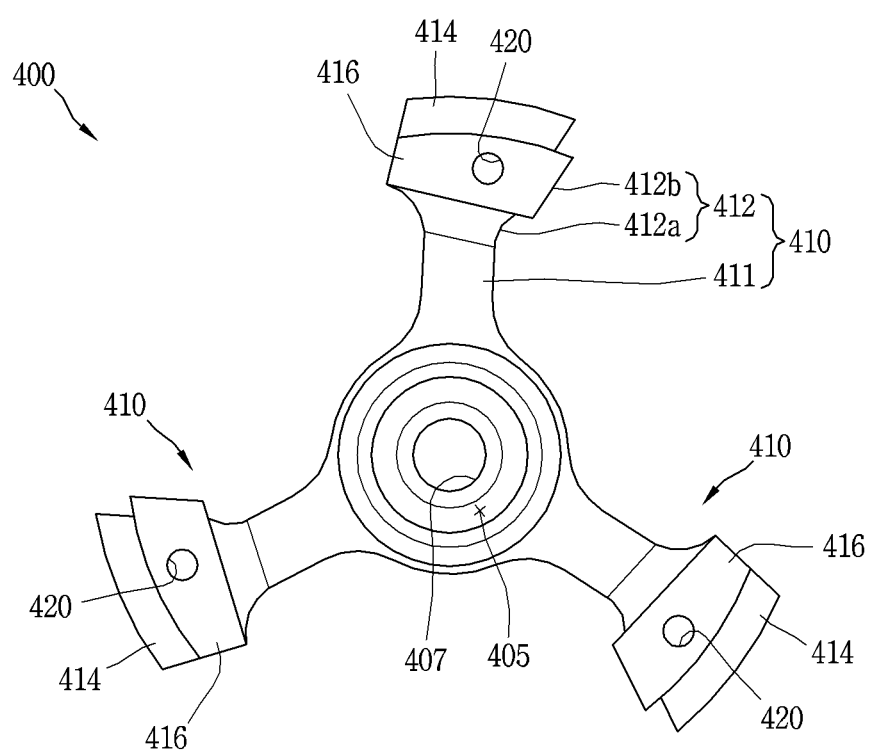
FIG. 13 is a planar view showing the bracket of FIG. 10.
Figure 14:
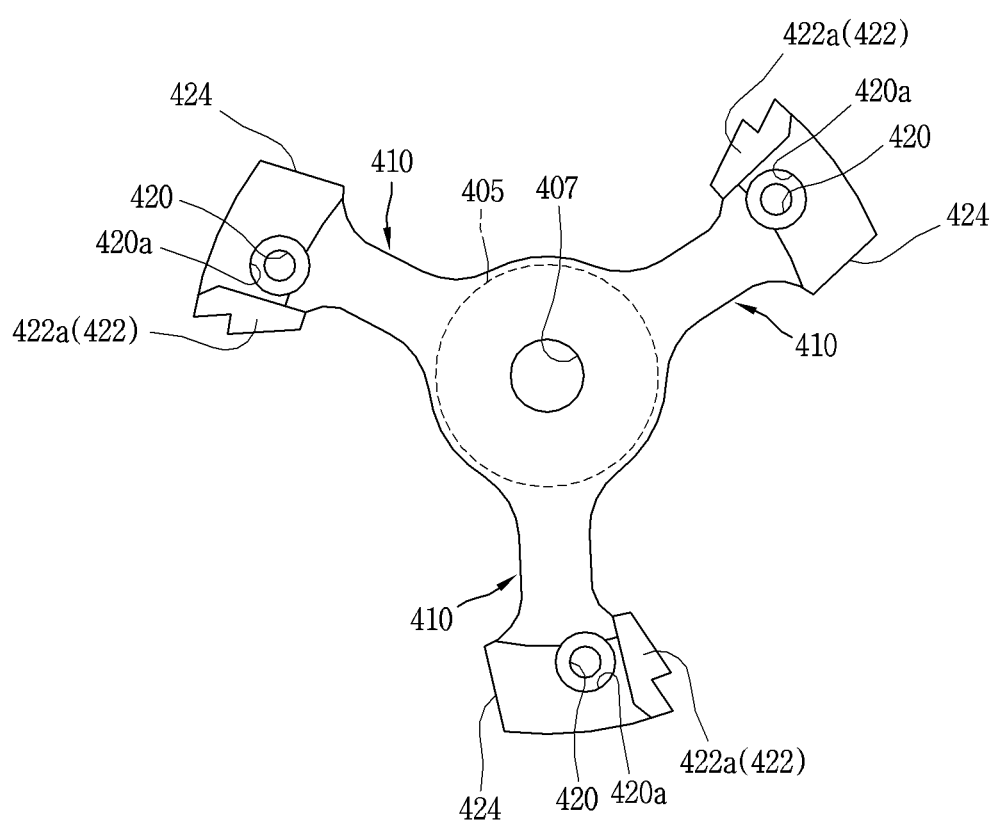
FIG. 14 is a bottom view showing the bracket of FIG. 13.

FIG. 10 is an enlarged perspective view showing an example of a bracket of FIG. 3, FIG. 11 is a front view showing the bracket of FIG. 10, FIG. 12 illustrates an example of an exterior of the bracket of FIG. 11, FIG. 13 is a planar view showing the bracket of FIG. 10, and FIG. 14 is a bottom view showing the bracket of FIG. 13. As illustrated in FIGS. 10 to 14, the bracket 400 includes the second bearing accommodating portion 405 to which the second bearing 300b is accommodated and coupled, and the frame coupling part 410 having one end connected to the second bearing accommodating portion 405 and another end coupled to the frame 350.

The second bearing accommodating portion 405 has a cylindrical shape with one side (upper side in the drawing) open.

The second bearing accommodating portion 405 is formed such that a side facing the rotor 270 is open.

A through-hole 407 is formed on another side of the second bearing accommodating portion 405.

Accordingly, heat exchange (heat dissipation) between an inside and an outside of the second bearing accommodating portion 405 can be facilitated.

An outer diameter of the through-hole 407 of the second bearing accommodating portion 405 can be less (or smaller) than an outer diameter of the inner ring 303 of the second bearing 300b, for example.

The frame coupling part 410 can be coupled to the stator fixing part 360 of the frame 350, for example.

The frame coupling part 410 can extend from the second bearing accommodating portion 405 in the radial direction and be spaced apart in the circumferential direction.

The frame coupling part 410 can be provided in plurality so as to correspond to the number of stator fixing parts 360.

In some implementations, three frame coupling parts 410 can be provided to correspond to the three stator fixing parts 360.

The frame coupling parts 410 can each include, for example, a radial section 411 that radially extends from the second bearing accommodating portion 405 and a bent section 412 that is bent from the radial section 411 and is disposed in the axial direction.

In some examples, the second bearing accommodation portion 405 protrudes longer than the radial section 411 in the axial direction.

The bent section 412 can include, for example, an inclined portion 412a that extends outwardly to be inclined more than the radial section 411 and an axial portion 412b that is bent from the inclined portion 412a and is disposed in the axial direction.

In some examples, the bent section 412 can include the inclined portion 412a and the axial portion 412b. However, this is just an example, and the bent section 412 can be configured to only have the axial portion 412b.

The outer surface of the second bearing accommodating portion 405 can include an inclined surface 408 that is inclined toward the frame coupling part 410.

Accordingly, a support force of the second bearing accommodating portion 405 can be increased, allowing transverse displacement of the second bearing 300b to be suppressed.

The frame coupling part 410 can include, for example, a leg contact portion 414 in contact with an end of the leg 370 of the frame 350 and a stator fixing part contact portion 416 in contact with an end of the stator fixing part 360 of the frame 350.

The leg contact portion 414 can be in surface contact with the end of the leg 370.

The stator fixing part contact portion 416 can be in surface contact with the end of the stator fixing part 360.

The leg contact portion 414 can be disposed at an outside of the stator fixing part contact portion 416.

The stator fixing part contact portion 416 protrudes longer than the leg contact portion 414 in the axial direction.

The leg contact portion 414 and the stator fixing part contact portion 416 define a stair shape.

The leg contact portion 414 and the stator fixing part contact portion 416 can protrude longer than the second bearing accommodating portion 405 in the axial direction.

Fixing member coupling portions 420 can be formed through the bracket 400 (frame coupling parts 410) so that the fixing members 366 coupled to the frame 350 are respectively coupled thereto.

The fixing member coupling portions 420 of the bracket 400 can each have an extended portion 420a in which a head of the fixing member 366 is inserted.

The fixing member coupling portions 420 can be provided at the inclined portions 412a of the bracket 400, respectively.

In some examples, an upstream surface 422 of the frame coupling part 410 of the bracket 400, with respect to the flow of air moved by the impeller 110, can be inclined in the axial direction so as to correspond to the rotational component of air moved by the impeller 110, for example.

The upstream surface 422 of the frame coupling part 410 of the bracket 400 can include a cut (or cutout) portion 422a which is cut in an inclined manner so as to correspond to the upstream surface (first side surface 361) of the stator fixing part 360.

An upstream surface of the leg contact portion 414 and an upstream surface of the stator fixing part contact portion 416 can be, for example, cut in an inclined manner so as to correspond to the first side surface 371 of the leg 370 and the first side surface 361 of the stator fixing part 360, respectively.

A downstream surface of the frame coupling part 410 of the bracket 400 with respect to the flow of air, can be disposed along the axial direction, for example.

Figure 15:
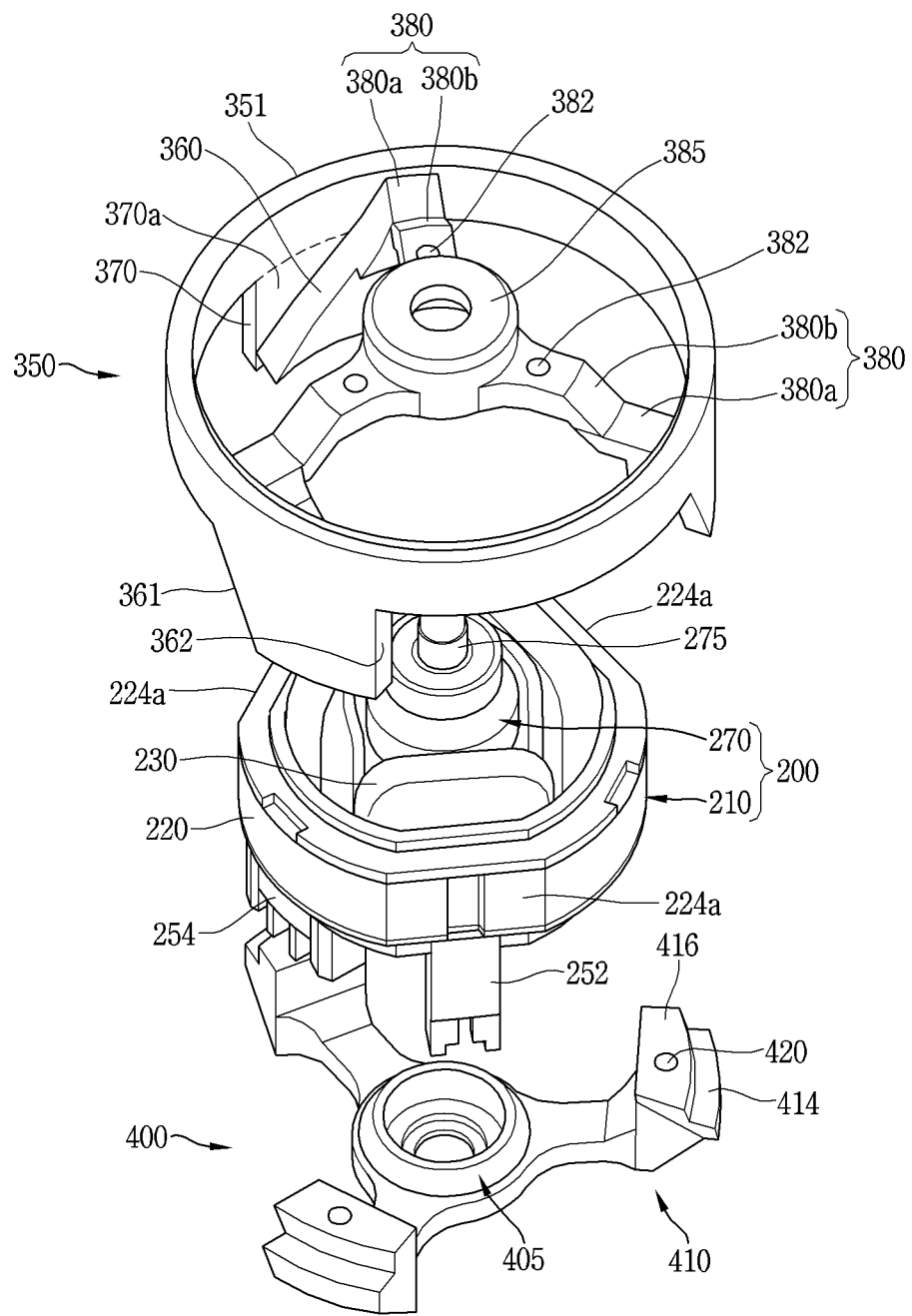
FIG. 15 is an exploded view showing examples of a frame, a stator, and a bracket of FIG. 3.
Figure 16:
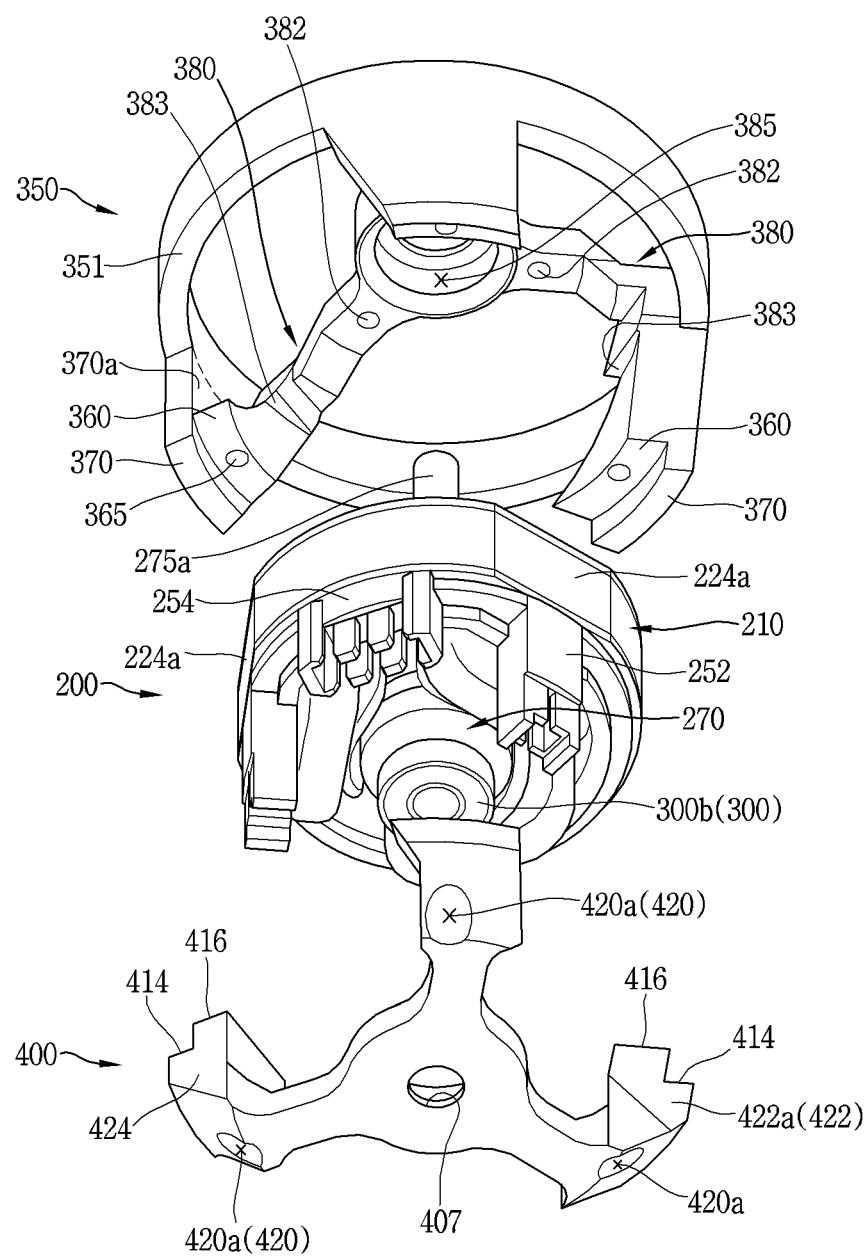
FIG. 16 is a bottom perspective view showing the frame, the stator, and the bracket of FIG. 15.
Figure 17:
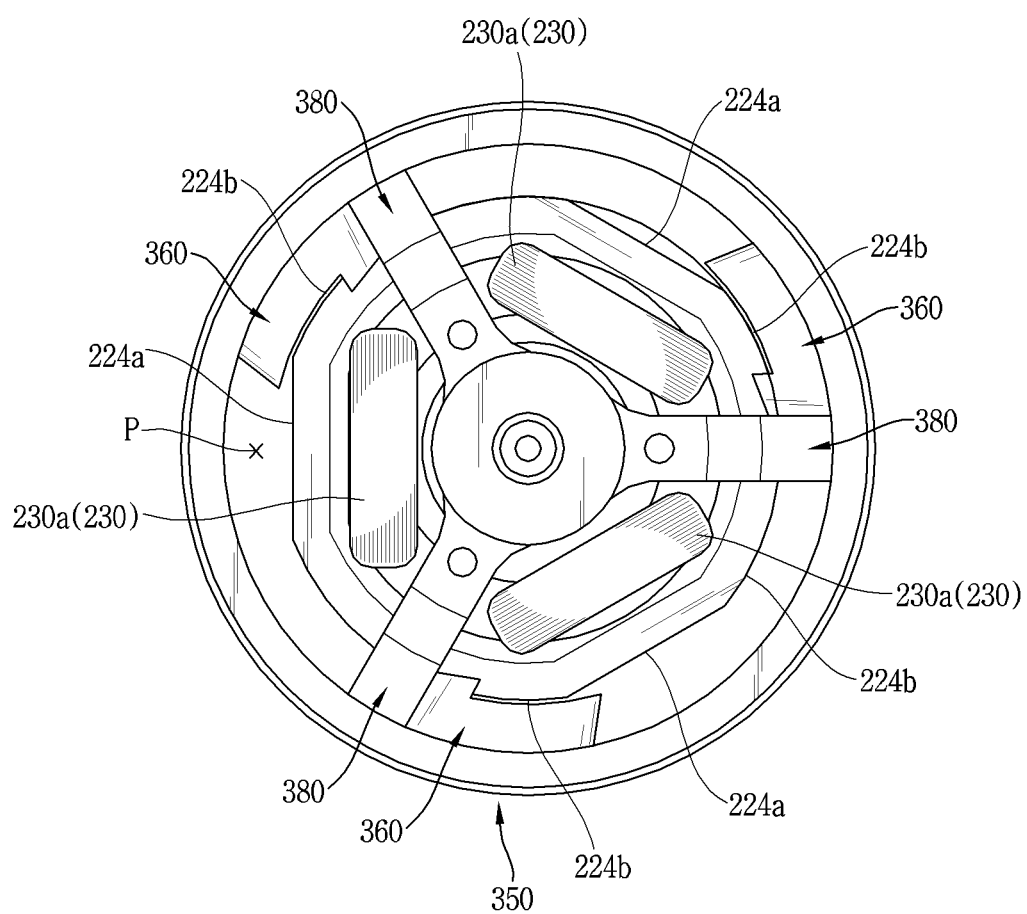
FIG. 17 is a planar view illustrating an example of a coupled state of the frame, the stator, and the bracket of FIG. 15.

FIG. 15 is an exploded view showing examples of a frame, a stator, and a bracket of FIG. 3, FIG. 16 is a bottom perspective view showing the frame, the stator, and the bracket of FIG. 15, and FIG. 17 is a planar view illustrating an example of a coupled state between the frame, the stator, and the bracket of FIG. 15. As illustrated in FIGS. 15 and 16, when coupling the stator 210 and the rotor 270 together, and coupling the frame 350 and the bracket 400 together, the leg 370 of the stator 210 is disposed to face one side (lower side in the drawing), and the frame 350 is disposed at an upper side of the stator 210. Then, the first bearing 300a is disposed to face the frame 350 (upper side) inside the stator 210 so that the rotor 270 is accommodatingly disposed. The bracket 400 is disposed at a lower side of the rotor 270.

The stator fixing part 360 of the frame 350 is disposed to correspond to a circumferential surface of the stator 210, and the stator 210 and the frame 350 are moved relative to each other in the axial direction. When the stator fixing part 360 comes in surface contact with the outer surface of the stator 210, the stator fixing part 360 is coupled to the outer surface of the stator 210 while sliding relative to it.

The first bearing 300a can be insertedly coupled to an inside of the first bearing accommodating portion 385 of the frame 350.

When an upper end of the stator 210 is brought into contact with the stator contact portion 383 of the frame 350, insertion is limited or restricted. Then, the coupling is completed.

Referring to FIG. 17, of the outer surface of the stator 210, each of the stator fixing parts 360 is coupled to an outer circumferential surface having an arcuate shape, and a flow path (or passage) P of air moved by rotation of the impeller 110 is formed between the plurality of bridges 380.

The air flow path P between the inner surface of the body 351 of the frame 350 and the stator 210 can have an increased cross-sectional area of air flow owing to the flat surface 224a of the outer surface of the stator 210.

The plurality of legs 370 and the plurality of stator fixing parts 360 can protrude downward of the stator 210.

The leg contact portions 414 and the stator fixing part contact portions 416 of the bracket 400 are disposed to correspond to the legs 370 and the stator fixing parts 360, respectively, so that the second bearing 300b is axially pressed against an entrance (or inlet) of the second bearing accommodating portion 405 to make them close to each other.

The second bearing 300b is insertedly coupled to an inside of the second bearing accommodating portion 405, and the legs 370 and the stator fixing parts 360 can be coupled to the corresponding leg contact portions 414 and the corresponding stator fixing part contact portions 416 in a surface contact manner, respectively. The PCB coupling portions 252 of the stator 210 can each protrude downward of the bracket 400.

When relative movement between the frame 350 and the bracket 400 is stopped, the fixing member coupling portion 365 of the stator fixing part 360 and the fixing member coupling portion 420 of the bracket 400 can communicate with each other. The fixing members 366 are respectively inserted into the fixing member coupling portions 365 and the fixing member coupling portions 420 in communication with each other, and then the fixing members 366 are rotated to be coupled to the respective fixing member coupling portions 365 of the stator fixing parts 360.

When the coupling of the bracket 400 is completed, the PCB 450 is disposed at a lower side of the bracket 400, and the PCB 450 is disposed to be in contact with ends of the PCB coupling portions 252 of the stator 210, allowing the PCB coupling portions 252 and the PCB 450 to be integrally fixed and coupled to each other. Power lines of phases (U phase, V phase, and W phase) of the PCB coupling portions 252 can be electrically connected to the PCB 450.

The guide vane 140 can be coupled to an upper side of the frame 350. The guide vane 140 is coupled to upper ends of the plurality of bridges 380, and the guide vane 140 is integrally fixed and coupled to the frame 350 by the fixing member 387.

Then, the impeller 110 is coupled to an end of the rotating shaft 275 of the rotor 270 penetrating through the guide vane 140, and the impeller housing 170 is coupled such that the impeller 110 can be accommodated therein. The body 351 of the frame 350 is accommodatingly coupled to an inside of the frame accommodating portion 179 of the impeller housing 170.

Figure 18:
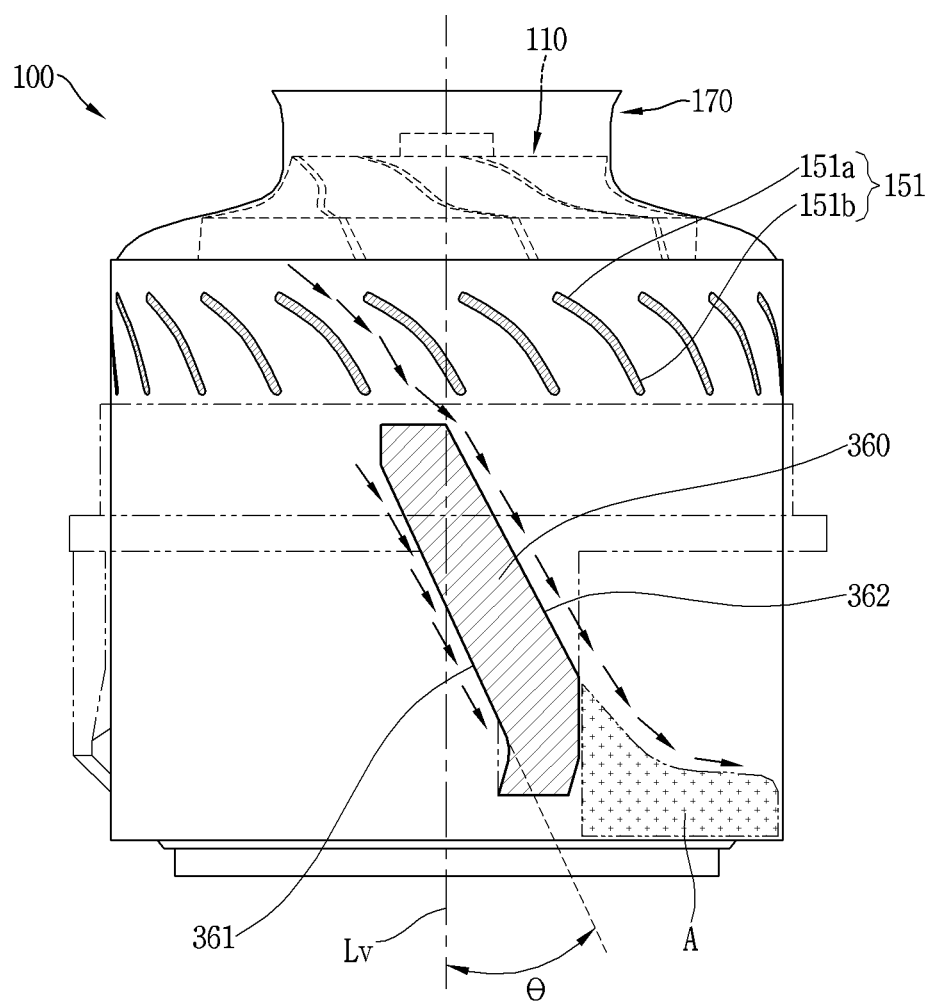
FIG. 18 illustrates an example of a flow of air in the electric motor assembly of FIG. 1.
Figure 19:
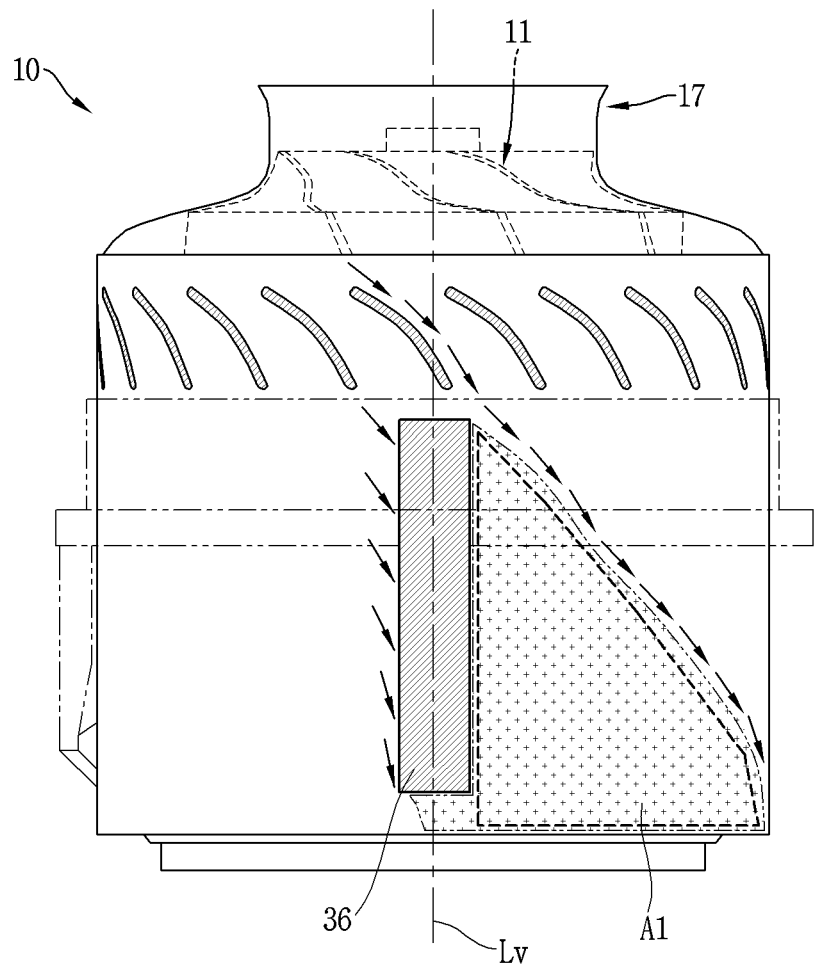
FIG. 19 illustrates an example of a flow of air in an electric motor assembly in related art.

FIG. 18 illustrates an example of a flow of air in the electric motor assembly of FIG. 1, and FIG. 19 illustrates an example of a flow of air in an electric motor assembly in related art.

When operation is started and power is applied to the stator coil 230, a rotating magnetic field produced by the stator coil 230 and a magnetic field produced by the permanent magnet 290 of the rotor 270 interact with each other, allowing the rotor 270 to be rotated about the rotating shaft 275. When the rotor 270 rotates, the impeller 110 is rotated about the rotating shaft 275.

When the impeller 110 rotates, air outside the impeller housing 170 is suctioned through the air inlet 172. The air suctioned into the impeller housing 170 is discharged in the radial direction by the plurality of blades 114 of the impeller 110, and is then guided in the axial direction by the impeller housing 170 and the guide vane 140.

In detail, as shown in FIG. 18, the air discharged by the impeller 110 flows in the axial direction by an inner surface of the impeller housing 170, an outer surface of the vane hub 141, and the plurality of vanes 151 while moving to be downwardly inclined to the right in the drawing along a rotation direction of the impeller 110.

In some examples, with respect to the flow of air moved by the impeller 110, the upstream surface (first side surface 361) of the stator fixing part 360 is inclined in the axial direction so as to correspond to the rotational component of air, thereby suppressing an air flow loss.

In addition, the second side surface 362 (downstream surface) of the stator fixing part 360 is inclined with respect to the axial direction so as to correspond to the rotational component of air moved by the impeller 110, allowing an air flow stagnant zone (A: cross-sectional area) to be reduced.

As a result, a flow loss of the air moved by the impeller 110 can be significantly reduced.

Referring to FIG. 19, an electric motor assembly 10 in related art includes a stator fixing part disposed along an axial direction, an impeller 11, an impeller housing 17, and a stator fixing part 36 disposed in the axial direction. With respect to a flow of air moved by rotation of the impeller 11, an upstream surface of the stator fixing part 36 is disposed in the axial direction, and thus, air flow resistance can be significantly increased due to contact with the rotational component of air moved by the impeller 11.

In addition, with respect to the flow of air, as a downstream surface of the stator fixing part 36 is disposed along the axial direction, an air flow stagnant zone (A1: cross-sectional area) with a relatively large triangular shape can be generated in a downstream region of the stator fixing part 36. Accordingly, in the case of the related art motor assembly 10, flow performance of air moved by the impeller 11 may be reduced.

Figure 20:
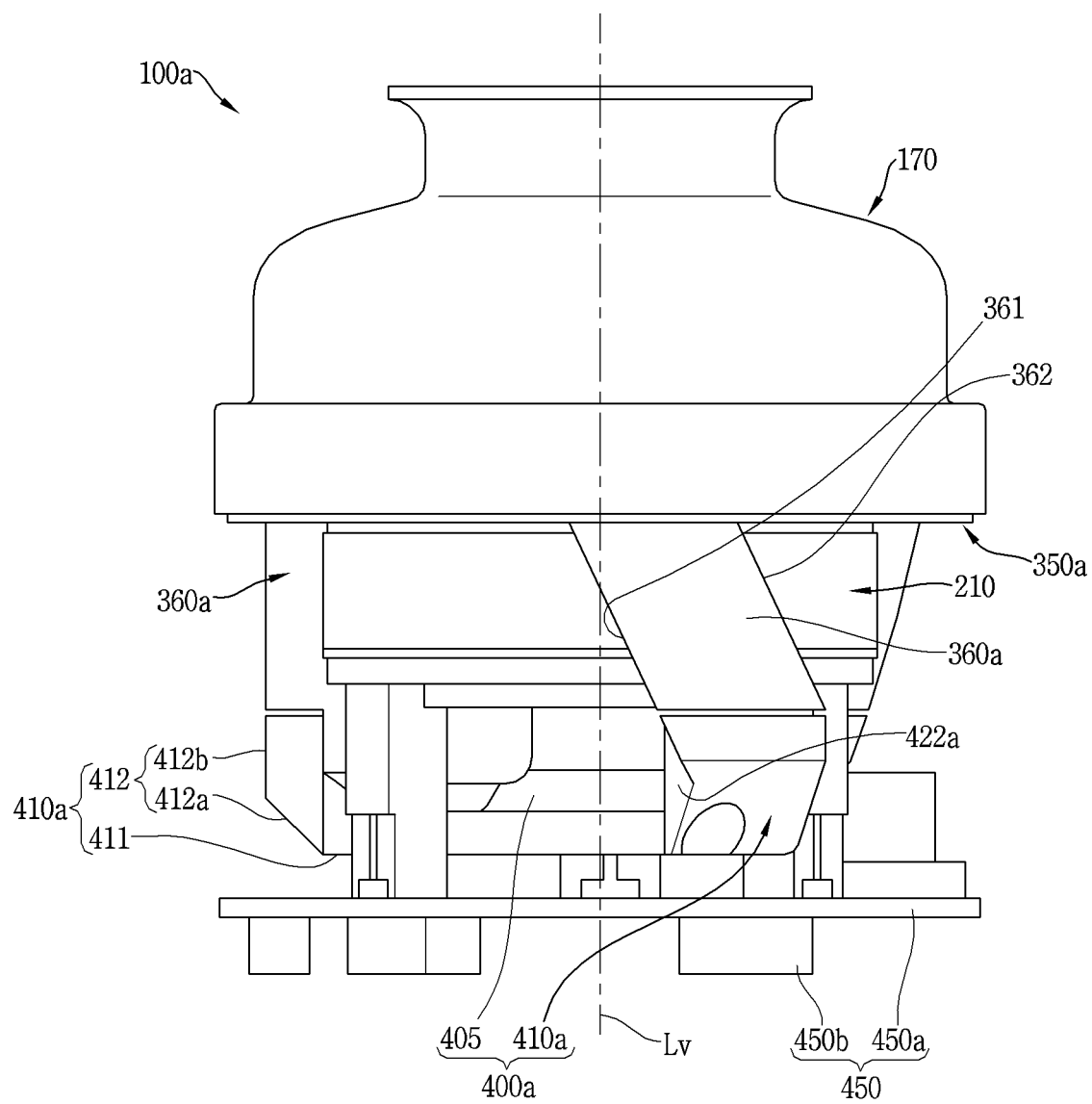
FIG. 20 is a front view showing an example of an electric motor assembly.
Figure 21:
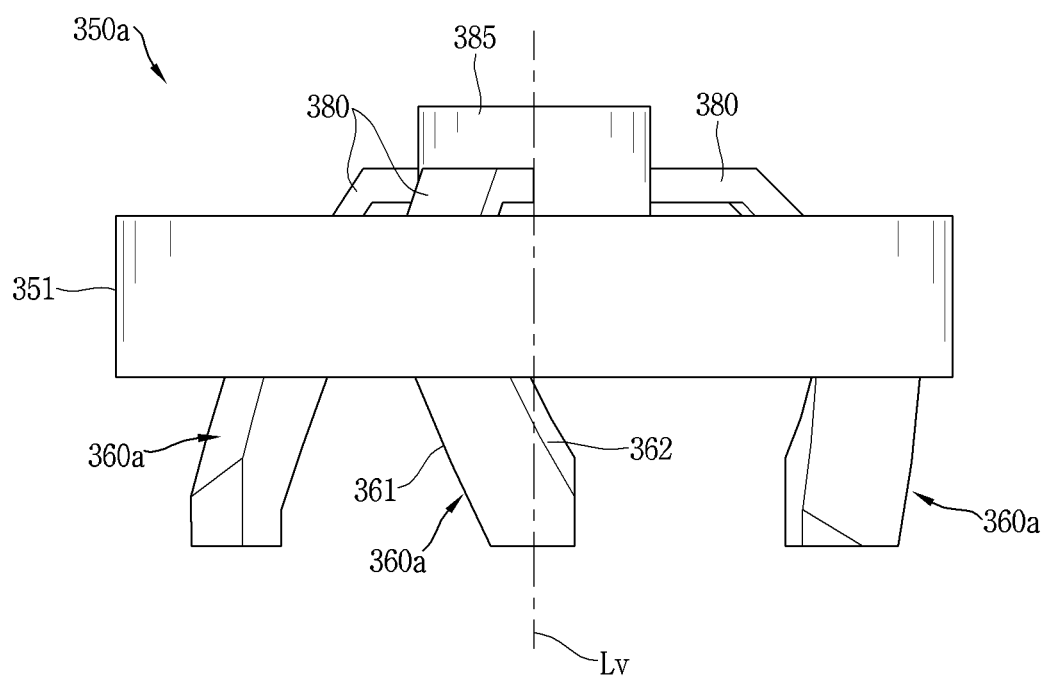
FIG. 21 is a front view showing an example of a frame of FIG. 20.

FIG. 20 is a front view showing an example of an electric motor assembly, and FIG. 21 is a front view showing an example of a frame of FIG. 20. An electric motor assembly 100a can include an impeller 110, a stator 210, a rotor 270, a frame 350a, and a bracket 400a.

The stator 210 includes a stator core 220, a stator coil 230 wound around the stator core 220, and an insulator 250 disposed between the stator core 220 and the stator coil 230, as described above.

The rotor 270 is provided inside the stator 210.

The rotor 270 can include a rotating shaft 275, a rotor core 280 that is coupled to the rotating shaft 275, and a permanent magnet 290 that is coupled to the rotor core 280, as described above.

A first bearing 300a and a second bearing 300b that rotatably support the rotating shaft 275 are provided at both sides of the rotor 270, respectively.

The frame 350a can be coupled to the stator 210.

The frame 350a includes, for example, a body 351 having a ring shape and a stator fixing part 360a that protrudes from an inner surface of the body 351 and is coupled to an outer surface of the stator 210 in a surface contact manner.

The stator fixing part 360a is inclined with respect to the axial direction so as to correspond to the rotational component of air moved by the impeller 110, for example.

The stator fixing part 360a can be three in number so as to be disposed between three teeth 225, for example.

The stator fixing part 360a can have a constant or same thickness along the circumferential direction.

The impeller 110 is coupled to one end (upper end in the drawing) of the rotating shaft 275.

A guide vane 140 for guiding air moved by the impeller 110 is provided between the impeller 110 and the rotor 270.

The guide vane 140 includes a vane hub 141 and a plurality of vanes 151 disposed in a circumference of the vane hub 141, as described above.

An impeller housing 170 is provided at an outside of the impeller 110. The impeller housing 170 can include an impeller accommodating portion 176 in which the impeller 110 is accommodated, a vane accommodating portion 178 in which the guide vane 140 is accommodated, and a frame coupling part 410a to which the frame 350a is accommodatingly coupled.

A bracket 400a that accommodates and supports the second bearing 300b is coupled to the frame 350a.

A PCB 450 is provided at one side (lower side in the drawing) of the bracket 400a. The PCB 450 includes, for example, a substrate 450a having a disk shape and a plurality of circuit parts 450b that is provided at the substrate 450a and constitutes an electric circuit. The PCB 450 is coupled to a PCB coupling portion 252 formed at the insulator 250 of the stator 210.

Figure 22:
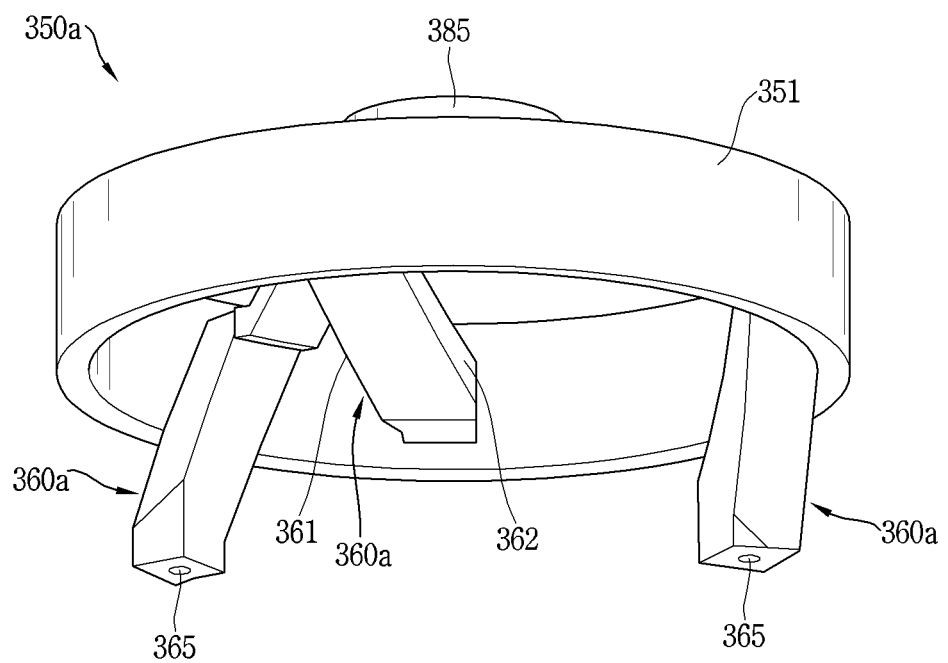
FIG. 22 is a bottom perspective view showing the frame of FIG. 21.

As illustrated in FIGS. 21 and 22, the frame 350a includes a first bearing accommodating portion 385 protruding upwards of the body 351 along the axial direction and to which the first bearing 300a is accommodated and coupled. The body 351 is provided with a plurality of bridges 380 having one end connected to the inner surface of the body 351 and another end connected to the first bearing accommodating portion 385.

In some implementations, the stator fixing part 360a has a constant thickness along the circumferential direction. However, this is just an example, and the stator fixing part 360a can have a thickness that gradually increases downward along the axial direction.

A lower end of the stator fixing part 360a can be in surface contact with the bracket 400a.

The bracket 400a of the electric motor assembly 100a of this example has a structure similar to the bracket 400 of the example described above. The bracket 400a includes a second bearing accommodating portion 405 to which the second bearing 300b is accommodated and coupled, and the frame coupling part 410a having one end connected to an outer surface of the second bearing accommodating portion 405 and another end coupled to the stator fixing part 360a of the frame 350a.

The frame coupling part 410a of the bracket 400a of this example includes a radial section 411 that radially extends from the outer surface of the second bearing accommodating portion 405 and a bent section 412 that is bent from the radial section 411, is disposed in the axial direction, and includes an inclined portion 412a extending from the radial section 411 in an inclined manner and an axial portion 412b bent from the inclined portion 412a and disposed along the axial direction. The axial portion 412b can have a contact surface with a size that corresponds to a contact surface of the lower end of the stator fixing part 360a.

A cut portion 422a can be formed at an upstream surface of the bracket 400a with respect to a flow of air moved by rotation of the impeller 110, so as to correspond to the rotational component of air moved by the impeller 110. The cut portion 422a can be disposed on an extended line of a first side surface 361 of the stator fixing part 360a.

When operation is started and power is applied to the stator 210, a magnetic field produced by the stator coil 230 and a magnetic field produced by a permanent magnet 290 of the rotor 270 interact with each other, allowing the rotor 270 to be rotated about the rotating shaft 275. As the rotating shaft 275 rotates, the impeller 110 is rotated.

When the impeller 110 rotates, air is suctioned into the impeller housing 170, and the suctioned air is discharged along a radial direction of the impeller 110. The air discharged by the impeller 110 is guided by an inner surface of the impeller housing 170 and the guide vane 140 to flow downward along the axial direction.

In some examples, the air moved by the impeller 110 has a rotational component that rotates in the same direction as a rotation direction of the impeller 110, and the first side surface 361 of the stator fixing part 360a is inclined with respect to the axial direction so as to correspond to the rotational component of air moved by the impeller 110. This can result in significantly suppressing an increase in air flow resistance.

In addition, a second side surface 362 of the stator fixing part 360a can be inclined with respect to the axial direction so as to correspond to the rotational component of air moved by the impeller 110, and thus, formation of an air flow stagnant zone A, due to stagnant air flow, in a downstream region of the stator fixing part 360a can be significantly reduced.

As a result, air flow performance in the electric motor assembly 100a of this example can be greatly increased.

Figure 23:
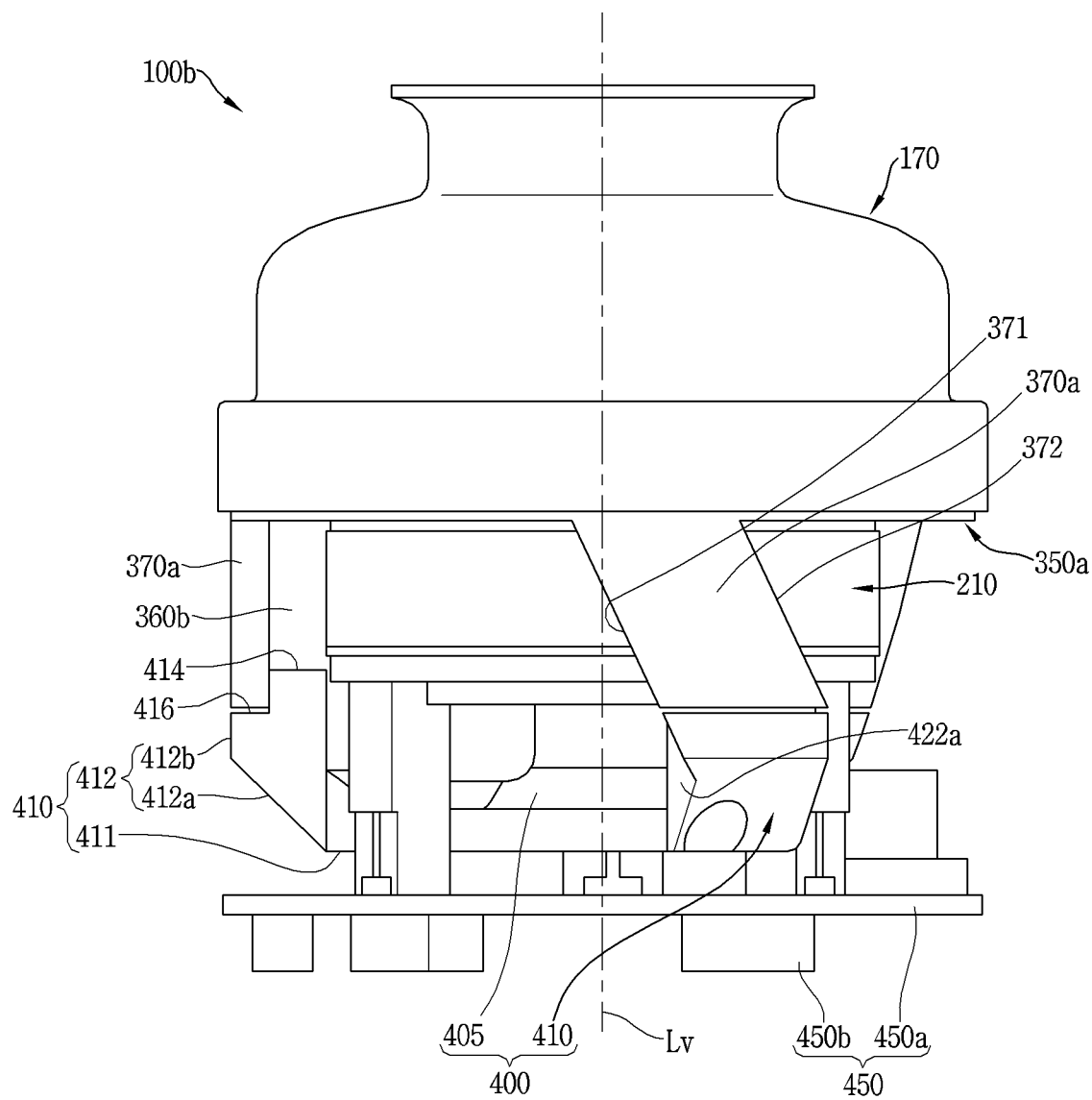
FIG. 23 is a front view showing an example of an electric motor assembly.
Figure 24:
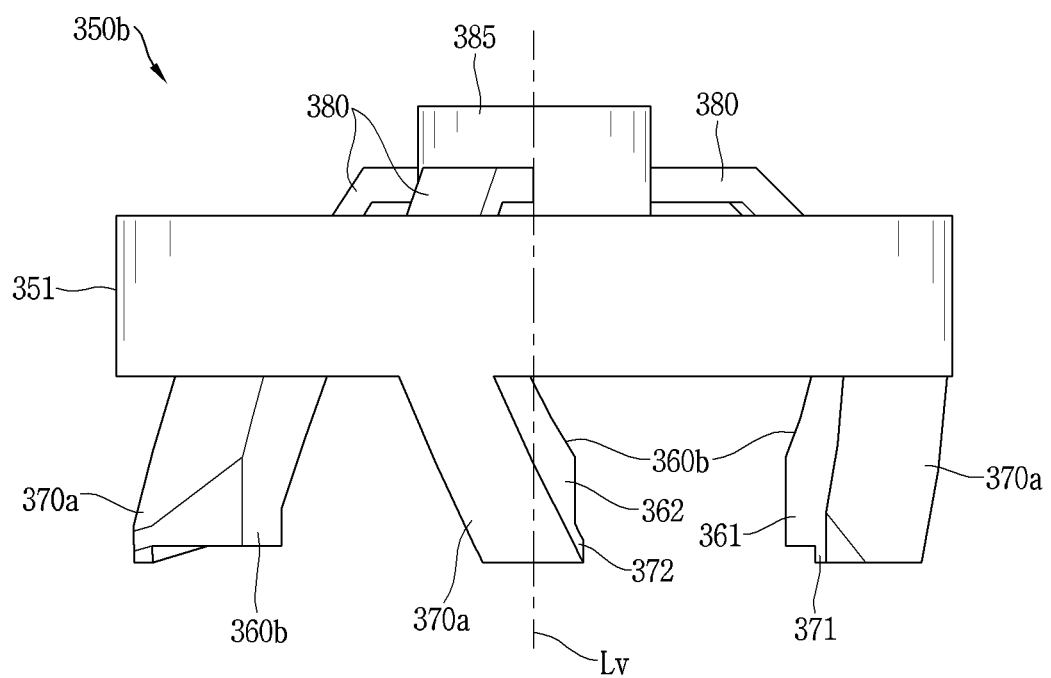
FIG. 24 is a front view showing an example of a frame of FIG. 23.
Figure 25:
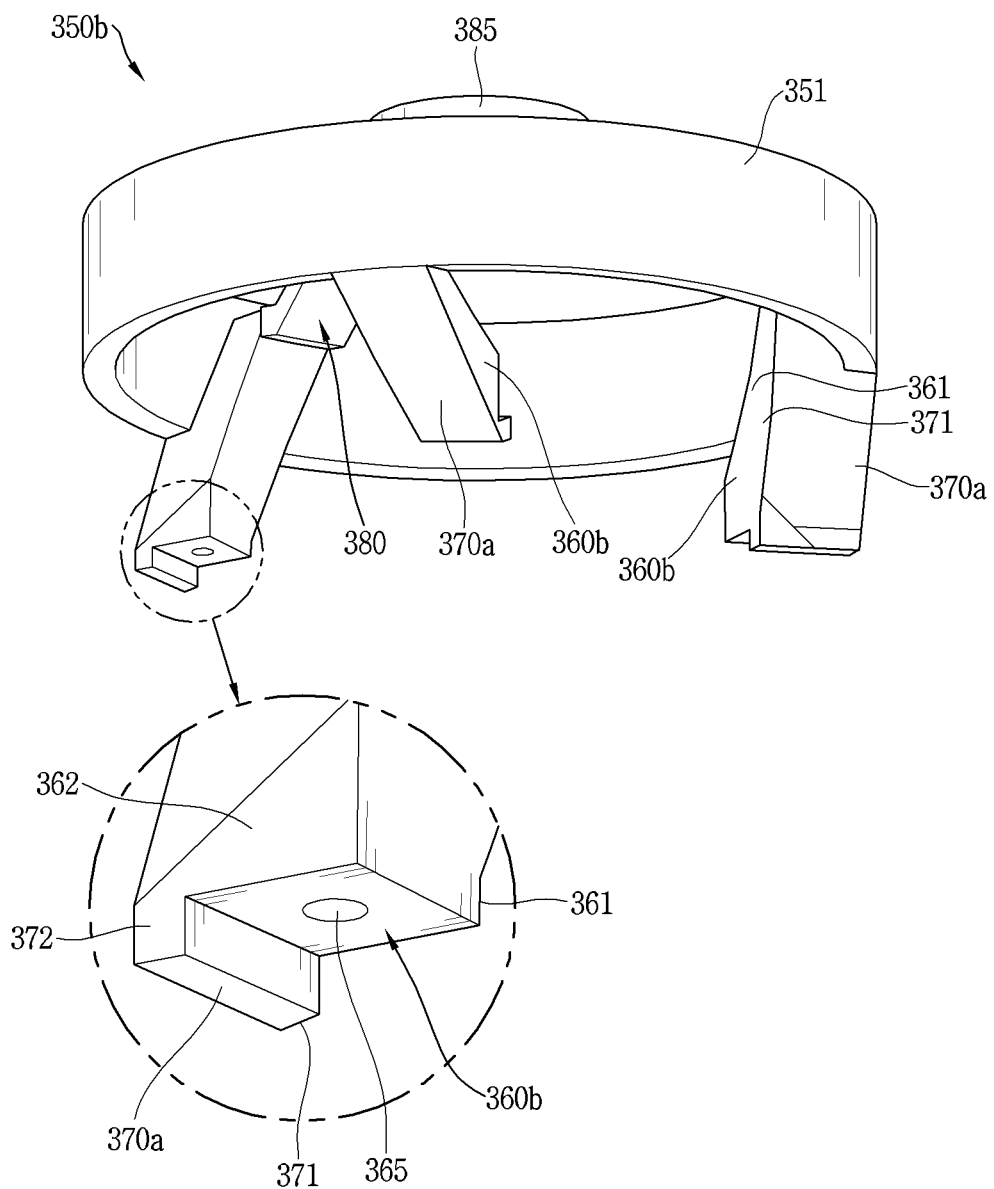
FIG. 25 is a bottom perspective view showing the frame of FIG. 24.

FIG. 23 is a front view showing an example of an electric motor assembly, FIG. 24 is a front view showing an example of a frame of FIG. 23, and FIG. 25 is a bottom perspective view showing the frame of FIG. 24. An electric motor assembly 100b can include an impeller 110, a stator 210, a rotor 270, a frame 350b, and a bracket 400.

The impeller 110 can include a hub 112 and a plurality of blades 114 disposed in a circumference of the hub 112 to be spaced apart from one another.

The stator 210 includes a stator core 220, a stator coil 230 wound around the stator core 220, and an insulator 250 for insulating the stator coil 230.

The rotor 270 includes a rotating shaft 275, a rotor core 181 coupled to the rotating shaft 275, and a permanent magnet 290 coupled to the rotor core 280.

The impeller 110 is coupled to the rotating shaft 275.

A guide vane 140 for guiding air moved by the impeller 110 is provided at one side (lower side in the drawing) of the impeller 110.

The guide vane 140 includes a vane hub 141 and a plurality of vanes 151 disposed in a circumference of the vane hub 141 to be spaced apart from one another.

The frame 350b is provided on an outer surface of the stator 210. An impeller housing 170 in which the impeller 110 is rotatably accommodated is coupled to an upper side of the frame 350b. A bracket 400 that accommodates and supports a second bearing 300b is coupled to a lower side of the frame 350b. A PCB 450 is provided at a lower side of the bracket 400.

The frame 350b of this implementation includes a body 351 having a ring shape and a stator fixing part 360b that protrudes from an inner surface of the body 351 and is coupled to the outer surface of the stator 210 in a surface contact manner.

The stator fixing part 360b can be three in number, so as to be disposed between three teeth 225 of the stator 210.

The stator fixing part 360b is inclined with respect to the axial direction so as to correspond to the rotational component of air moved by the impeller 110.

The stator fixing part 360b has a constant or same thickness along the circumferential direction, for example.

The stator fixing part 360b can be formed such that a thickness of the body 351 side and a thickness of an end (lower end) of the stator fixing part 360b are the same.

The frame 350b of this implementation is provided with a leg 370a axially extending from the body 351 and is disposed at an outer side of the stator fixing part 360b.

Accordingly, deformation of the stator fixing part 360b due to an external force in a transverse direction can be suppressed.

The legs 370a is provided in plurality so as to correspond to the number of stator fixing parts 360b.

The legs 370a can be three in number so as to correspond to the three stator fixing parts 360b.

Like the examples described above, the leg 370a can protrude longer than the stator fixing part 360b in the axial direction with respect to the body 351.

For example, a first side surface 361 of the stator fixing part 360b and a first side surface 371 of the leg 370a with respect to a flow of air moved by rotation of the impeller 110 are inclined with respect to the axial direction so as to correspond to the rotational component of air moved by the impeller 110, allowing a flow loss of air moved by the impeller 110 to be suppressed.

In addition, as a second side surface 362 of the stator fixing part 360b and a second side surface 372 of the leg 370a with respect to the flow of air moved by rotation of the impeller 110 are inclined with respect to the axial direction so as to correspond to the rotational component of air moved by the impeller 110, formation of an air flow stagnant zone A, due to a stagnant flow of air moved by the impeller 110, in a downstream region of the stator fixing part 360b and a downstream region of the leg 370a can be significantly reduced.

The bracket 400 includes a second bearing accommodating portion 405 to which the second bearing 300b is accommodated and coupled, and a plurality of frame coupling parts 410 that radially extends from an outer surface of the second bearing accommodating portion 405 and is coupled to the frame 350b.

The plurality of frame coupling parts 410 can each include, for example, a radial section 411 that radially extends from the outer surface of the second bearing accommodating portion 405 and a bent section 412 that is bent from the radial section 411, is disposed in the axial direction, and includes an inclined portion 412a extending from the radial section 411 in an inclined manner and an axial portion 412b bent from the inclined portion 412a and disposed along the axial direction.

The plurality of frame coupling parts 410 of the bracket 400 can each include, for example, a leg contact portion 414 in contact with the leg 370a and a stator fixing part contact portion 416 in contact with the stator fixing part 360b.

A fixing member coupling portion 420 can be formed at the frame coupling part 410 so as to be integrally fixed to the frame 350b by a fixing member. The fixing member coupling portion 420 can have an extended portion 420a in which a head of the fixing member is accommodated.

When operation is started and power is applied to the stator 210, a magnetic field produced by the stator coil 230 and a magnetic field produced by the permanent magnet 290 of the rotor 270 interact with each other, allowing the rotor 270 to be rotated with respect to the rotating shaft 275. As the rotating shaft 275 rotates, the impeller 110 is rotated.

When the impeller 110 rotates, air is suctioned into the impeller housing 170, and the suctioned air is discharged along a radial direction of the impeller 110. The air discharged by the impeller 110 is guided by an inner surface of the impeller housing 170 and the guide vane 140 to flow downward along the axial direction.

In some examples, the air moved by the impeller 110 has a rotational component that rotates in the same direction as a rotation direction of the impeller 110, and the first side surface 361 of the stator fixing part 360b and the first side surface 371 of the leg 370a are inclined with respect to the axial direction so as to correspond to the rotational component of air moved by the impeller 110. This can result in significantly suppressing an increase in air flow resistance.

In addition, as the second side surface 362 of the stator fixing part 360b and the second side surface 372 of the leg 370a are inclined with respect to the axial direction so as to correspond to the rotational component of air moved by the impeller 110, an air flow stagnant zone, due to stagnant air flow, in the downstream region of the stator fixing part 360b and the downstream region of the leg 370a can be significantly reduced.

Therefore, air flow performance in the electric motor assembly 100b of the present disclosure can be greatly increased.

In the foregoing, exemplary implementations of the present disclosure have been shown and described. However, the present disclosure can be implemented in various forms without departing from the spirit or essential characteristics thereof, and accordingly, it is intended that the implementations described above are not be limited by the detailed description provided herein.

Moreover, even if any implementation is not specifically disclosed in the foregoing detailed description, it should be broadly construed within the scope of the technical spirit, as defined in the accompanying claims. Furthermore, all modifications and variations included within the technical scope of the claims and their equivalents should be covered by the accompanying claims.

What is claimed is:

1. An electric motor assembly, comprising:
an impeller;
a guide vane disposed at a first side of the impeller along an axial direction, the guide vane comprising a plurality of vanes;
a stator disposed at one side of the guide vane along the axial direction;
a rotor configured to rotate relative to the stator to thereby rotate the impeller; and
a frame disposed at an outside of the stator in a radial direction and coupled to the stator,
wherein the frame comprises:
a body having a cylindrical shape, the body being disposed at the outside of the stator and defining an air flow path, and
a plurality of stator fixing parts that protrude from an inner surface of the body in the radial direction and are coupled to the stator, and
wherein the plurality of stator fixing parts are inclined with respect to the axial direction,
wherein the plurality of vanes are inclined with respect to the axial direction,
wherein an inclination direction of the plurality of stator fixing parts with respect to the axial direction is substantially equal to an inclination direction of the plurality of vanes with respect to the axial direction, and
wherein each of the plurality of stator fixing parts has a first side surface and a second side surface that face a circumferential direction of the body and are inclined with respect to the axial direction.

2. The electric motor assembly of claim 1, further comprising a first bearing disposed between the guide vane and the rotor in the axial direction,
wherein the frame defines a first bearing accommodating portion that receives the first bearing.

3. The electric motor assembly of claim 2, further comprising:
a second bearing disposed away from the impeller, wherein the rotor is disposed between the impeller and the second bearing in the axial direction; and
a bracket that accommodates and supports the second bearing.

4. The electric motor assembly of claim 3, wherein the bracket is coupled to the frame.

5. The electric motor assembly of claim 3, wherein the frame further comprises a plurality of legs that are coupled to the bracket, each of the plurality of legs protruding outside one of the plurality of stator fixing parts in the axial direction.

6. The electric motor assembly of claim 5, wherein each of the plurality of legs has a first side surface that extends from a circumference of the body, the first side surface being inclined with respect to the axial direction.

7. The electric motor assembly of claim 6, wherein each of the plurality of legs has a second side surface that extends from the circumference of the body and is spaced apart from the first side surface in the circumferential direction of the body, and
wherein at least a part of the second side surface of each of the plurality of legs extends further in the circumferential direction relative to a corresponding one of the plurality of stator fixing parts.

8. The electric motor assembly of claim 5, wherein each of the plurality of legs has a first side surface that is inclined with respect to the axial direction and a second side surface that is in parallel to the axial direction.

9. The electric motor assembly of claim 1, further comprising a first bearing, wherein the frame defines a first bearing accommodating portion that receives the first bearing,
wherein the frame further comprises a plurality of bridges that are radially connected to an outer surface of the first bearing accommodating portion, each of the plurality of bridges extending to one of the plurality of stator fixing parts.

10. The electric motor assembly of claim 1, further comprising a first bearing disposed in the frame, wherein the frame comprises a first bearing accommodating portion that receives the first bearing,
wherein the guide vane further comprises a vane hub, wherein the plurality of vanes are disposed at a circumference of the vane hub and spaced apart from one another in a circumferential direction of the vane hub, and
wherein the vane hub defines a penetrating portion that receives the first bearing accommodating portion.

11. The electric motor assembly of claim 10, wherein the frame further comprises a plurality of bridges that are radially connected to an outer surface of the first bearing accommodating portion, and
wherein the vane hub further defines a plurality of bridge accommodating portions that are recessed in the axial direction, each of the plurality of bridge accommodating portions receiving one of the plurality of bridges along the axial direction.

12. The electric motor assembly of claim 11, wherein each of the plurality of bridges comprises:

a vane hub contact section that radially protrudes from the body of the frame and is in contact with the vane hub; and
a vane hub coupling section that is inclined with respect to the vane hub contact section and axially protrudes from the vane hub contact section, the vane hub coupling section being coupled to and overlapping with the vane hub in the axial direction.

13. The electric motor assembly of claim 11, wherein each of the plurality of bridges comprises a fixing member coupling portion that receives a fixing member that has passed through the vane hub.

14. The electric motor assembly of claim 10, further comprising:
a second bearing disposed away from the impeller, wherein the rotor is disposed between the second bearing and the impeller in the axial direction; and
a bracket that defines a second bearing accommodating portion receiving the second bearing, the bracket comprising a plurality of frame coupling parts that radially protrude from an outer surface of the second bearing accommodating portion and are coupled to the frame,
wherein the frame further comprises a plurality of legs, each of the plurality of legs protruding outside one of the plurality of stator fixing parts in the axial direction and being coupled to the bracket.

15. The electric motor assembly of claim 14, wherein an axial length of the plurality of legs is greater than an axial length of the plurality of stator fixing parts in the axial direction, and
wherein each of the frame coupling parts of the bracket comprises:
a leg contact portion that is in contact with an end of one of the plurality of legs, and
a stator fixing part contact portion that is in contact with an end of one of the plurality of stator fixing parts.

16. The electric motor assembly of claim 1, further comprising:
a bracket disposed away from the impeller, wherein the rotor is disposed between the bracket and the impeller in the axial direction,
wherein the bracket defines a fixing member coupling portion that extends therethrough in the axial direction, the fixing member coupling portion being configured to receive a fixing member, and
wherein each of the plurality of stator fixing parts comprises a female thread portion that is coupled to the fixing member.

17. The electric motor assembly of claim 1,
wherein the first side surface has a linear shape inclined with respect to the axial direction,
wherein the second side surface has a curved shape and is spaced apart from the first side surface in the circumferential direction of the body, and
wherein the first side surface and the second side surface extend away from the body, and a circumferential width between the first side surface and the second side surface increases along the axial direction.

18. The electric motor assembly of claim 1, further comprising an impeller housing that accommodates the impeller, the impeller housing having an air inlet that faces a second side of the impeller opposite to the first side of the impeller.

19. The electric motor assembly of claim 18, wherein the impeller housing defines:
an impeller accommodating portion that accommodates the impeller;

a vane accommodating portion that accommodates the guide vane; and a frame accommodating portion that accommodates one side of the frame and is coupled to the frame.

20. The electric motor assembly of claim 1, wherein the second side surface of each of the plurality of stator fixing parts has a linear cross section or a curved cross section.

* * * * *